(12) United States Patent
Fenwick et al.

(10) Patent No.: US 11,061,397 B2
(45) Date of Patent: Jul. 13, 2021

(54) POWER MODULE FOR COMMON UNMANNED SYSTEM ARCHITECTURE

(71) Applicant: Insitu, Inc., Bingen, WA (US)

(72) Inventors: Christopher Fenwick, Hood River, OR (US); Kenneth Hillen, Aloha, OR (US); Douglas Allyn Miller, Sisters, OR (US); David Rathbun, White Salmon, WA (US)

(73) Assignee: Insitu Inc., Bingen, WA (US)

( * ) Notice: Subject to any disclaimer, the term of this patent is extended or adjusted under 35 U.S.C. 154(b) by 411 days.

(21) Appl. No.: 16/218,432

(22) Filed: Dec. 12, 2018

(65) Prior Publication Data

US 2020/0192347 A1   Jun. 18, 2020

(51) Int. Cl.
| | |
|---|---|
| *G05D 1/00* | (2006.01) |
| *B64C 39/02* | (2006.01) |
| *G06F 1/26* | (2006.01) |
| *H04B 7/185* | (2006.01) |
| *B64D 27/24* | (2006.01) |
| *H02H 9/02* | (2006.01) |

(52) U.S. Cl.
CPC ......... *G05D 1/0022* (2013.01); *B64C 39/024* (2013.01); *B64D 27/24* (2013.01); *G05D 1/0088* (2013.01); *H02H 9/02* (2013.01); *H04B 7/18506* (2013.01); *B64C 2201/146* (2013.01)

(58) Field of Classification Search
CPC . B64C 39/024; B64C 2201/146; B64D 27/24; G05D 1/0022; G05D 1/0088; G05D 1/00; H04B 7/18506; H02H 9/02; G06F 1/3203; G06F 1/26; G06F 1/28
See application file for complete search history.

(56) References Cited

U.S. PATENT DOCUMENTS

| | | | | |
|---|---|---|---|---|
| 2007/0252029 A1* | 11/2007 | Karem | ................ | G08G 5/0069 244/1 R |
| 2014/0244078 A1* | 8/2014 | Downey | ................ | G06F 21/44 701/11 |
| 2016/0114888 A1* | 4/2016 | Downey | ................ | B64D 47/08 701/2 |
| 2016/0236790 A1* | 8/2016 | Knapp | .................... | B64C 11/44 |
| 2018/0237148 A1* | 8/2018 | Hehn | .................... | B64C 39/024 |
| 2020/0192453 A1* | 6/2020 | Rathbun | .................. | G06F 1/28 |
| 2020/0192745 A1* | 6/2020 | Harty | ..................... | H04L 63/02 |

* cited by examiner

*Primary Examiner* — Peter D Nolan
*Assistant Examiner* — Demetra R Smith-Stewart
(74) *Attorney, Agent, or Firm* — McDonnell Boehnen Hulbert & Berghoff LLP

(57) ABSTRACT

Apparatus and methods for controlling unmanned systems (UMSs), such as unmanned aircraft, are provided. A UMS can be provided that includes core systems, auxiliary systems, a payload, and a power system. The power system can provide uninterruptible power for a first power domain that includes the core systems. The power system can provide interruptible power for each of a second power domain and a third power domain. The second power domain can include the auxiliary systems, and the third power domain can include the payload. First circuitry of the power system can prevent a single overcurrent fault in the third power domain from causing an electrical fault in either the first power domain or the second power domain. Second circuitry of the power system can prevent a single overcurrent fault in the second power domain from causing an electrical fault in the first power domain.

20 Claims, 9 Drawing Sheets

← 600

610 Provide an unmanned system (UMS) including a physical computer, one or more auxiliary systems for the UMS, and a payload

620 Execute software on the physical computer to cause the physical computer at least to instantiate a plurality of virtual computers that include a mission virtual computer and a payload virtual computer for:
- controlling the one or more auxiliary systems for the UMS using the mission virtual computer,
- communicating with the payload using the payload virtual computer,
- determining whether a software fault has occurred on one virtual computer of the plurality of virtual computers, and
- after determining that a software fault has occurred on one virtual computer of the plurality of virtual computers, preventing the software fault from causing a fault on a different virtual computer of the plurality of virtual computers

710 Provide an unmanned system (UMS) that includes one or more core systems for the UMS, one or more auxiliary systems for the UMS, a payload, a physical computer, and a power system

720 Logically separating the network and the physical computer into at least a second tier of communications and a third tier of communications for at least:
- communicating between the physical computer and the one or more auxiliary systems for the UMS using the second tier of communications, and
- communicating between the physical computer and the payload using the third tier of communications

730 Provide a first power domain for the one or more core systems for the UMS, a second power domain for the one or more auxiliary systems for the UMS, and a third power domain for the payload using the power system

740 Utilize first circuitry of the power system to inhibit a single overcurrent fault in the third power domain from causing an electrical fault in either the first power domain or the second power domain

750 Utilize second circuitry of the power system to inhibit a single overcurrent fault in the second power domain from causing an electrical fault in the first power domain

810 Provide an unmanned system (UMS) that includes one or more core systems for the UMS, one or more auxiliary systems for the UMS, a payload, and a power system

↓

820 Provide uninterruptible power for a first power domain using the power system, the first power domain including the one or more core systems for the UMS

↓

830 Provide interruptible power for each of a second power domain and a third power domain using the power system, the second power domain including the one or more auxiliary systems for the UMS, and the third power domain including the payload

↓

840 Prevent a single overcurrent fault in the third power domain from causing an electrical fault in either the first power domain or the second power domain using first circuitry of the power system

↓

850 Prevent a single overcurrent fault in the second power domain from causing an electrical fault in the first power domain using second circuitry of the power system

910 Provide an unmanned system (UMS) including a network, one or more auxiliary systems for the UMS, and a payload, where the network connects the one or more auxiliary systems for the UMS and the payload

↓

920 Logically separate the network into at least a second tier of communications, and a third tier of communications using a network switch of the network

↓

930 Control the UMS using the network by at least:
- controlling the one or more auxiliary systems for the UMS using messages communicated by the second tier of communications, and
- communicating with the payload using messages communicated by the third tier of communications

FIG. 9

POWER MODULE FOR COMMON UNMANNED SYSTEM ARCHITECTURE

FIELD

The present disclosure generally relates to unmanned systems (UMSs), and more particularly to methods and apparatus related to providing an unmanned system architecture utilizing common computational components that save size, weight, power, and cost while performing multiple roles within the unmanned system.

BACKGROUND

Unmanned systems, such as unmanned aircraft, have to be reliable. In particular, both unmanned and manned aircraft have to be very reliable, especially while airborne. To ensure reliability, a typical aircraft often utilize one or more redundant components. For example, large commercial airliners have multiple engines and fuel tanks to maintain flight even in the presence of one or more engine failures. As another example, redundant electronic components, such as avionics, on-board computers, and related networking equipment, can be utilized to ensure that an unmanned aircraft can maintain flight even after a failure of one or more electronic components aboard the unmanned aircraft.

SUMMARY

In one example, a method is provided. An unmanned system (UMS) is provided. The unmanned system includes a physical computer, one or more auxiliary systems for the unmanned system, and a payload. The physical computer executes software on the physical computer to cause the physical computer at least to instantiate a plurality of virtual computers that include a mission virtual computer and a payload virtual computer. The mission virtual computer and the payload virtual computer are for: controlling the one or more auxiliary systems for the unmanned system using the mission virtual computer, communicating with the payload using the payload virtual computer, determining whether a software fault has occurred on one virtual computer of the plurality of virtual computers, and after determining that a software fault has occurred on one virtual computer of the plurality of virtual computers, preventing the software fault from causing a fault on a different virtual computer of the plurality of virtual computers.

In another example, an unmanned system is described. The unmanned system includes: a physical computer; one or more auxiliary systems for the UMS; and a payload. The physical computer includes software that, when executed by the physical computer, causes the physical computer at least to instantiate a plurality of virtual computers that include a mission virtual computer and a payload virtual computer. The mission virtual computer and the payload virtual computer are for: controlling the one or more auxiliary systems for the UMS using the mission virtual computer, communicating with the payload using the payload virtual computer, determining whether a software fault has occurred on one virtual computer of the plurality of virtual computers; and after determining that a software fault has occurred on one virtual computer of the plurality of virtual computers, preventing the software fault from causing a fault on a different virtual computer of the plurality of virtual computers.

In another example, a non-transitory computer readable medium is described. The non-transitory computer readable medium having stored thereon software, that when executed by one or more processors of a physical computer of an unmanned system, cause the physical computer to perform functions. The functions include: instantiating a plurality of virtual computers that include a mission virtual computer and a payload virtual computer for: controlling one or more auxiliary systems for the UMS using the mission virtual computer, and communicating with a payload of the UMS using the payload virtual computer, determining whether a software fault has occurred on one virtual computer of the plurality of virtual computers, and after determining that a software fault has occurred on one virtual computer of the plurality of virtual computers, preventing the software fault from causing a fault on a different virtual computer of the plurality of virtual computers.

In another example, an unmanned system is described. The unmanned system includes: one or more core systems for the unmanned system, one or more auxiliary systems for the unmanned system; a payload; a physical computer; a network, and a power system. The network enables the physical computer to communicate with the one or more auxiliary systems for the unmanned system using at least a second tier of communications, and to communicate with the payload using a third tier of communications. The network and the physical computer logically separate at least the second tier of communications and the third tier of communications. The power system provides a first power domain for the one or more core systems for the unmanned system, a second power domain for the one or more auxiliary systems for the unmanned system, and a third power domain for the payload. The power system includes first circuitry that inhibits a single overcurrent fault in the third power domain from causing an electrical fault in either the first power domain or the second power domain and second circuitry that inhibits a single overcurrent fault in the second power domain from causing an electrical fault in the first power domain.

In another example, a method is provided. An unmanned system is provided that includes one or more core systems for the unmanned system, one or more auxiliary systems for the unmanned system a payload, a physical computer, a network, and a power system. The network and the physical computer are logically separated into at least a second tier of communications and a third tier of communications for at least: communicating between the physical computer and the one or more auxiliary systems for the unmanned system using the second tier of communications, and communicating between the physical computer and the payload using the third tier of communications. The power system provides: a first power domain for the one or more core systems for the unmanned system, a second power domain for the one or more auxiliary systems for the unmanned system, and a third power domain for the payload. First circuitry of the power system is utilized to inhibit a single overcurrent fault in the third power domain from causing an electrical fault in either the first power domain or the second power domain. Second circuitry of the power system is utilized to inhibit a single overcurrent fault in the second power domain from causing an electrical fault in the first power domain.

In another example, a method is provided. An unmanned system is provided that includes one or more core systems for the unmanned system, one or more auxiliary systems for the unmanned system, a payload, and a power system. The power system provides uninterruptible power for a first power domain. The first power domain includes the one or more core systems for the unmanned system. The power system provides interruptible power for each of a second power domain and a third power domain. The second power domain includes the one or more auxiliary systems for the unmanned system. The third power domain includes the payload. First circuitry of the power system prevents a single overcurrent fault in the third power domain from causing an electrical fault in either the first power domain or the second power domain. Second circuitry of the power system prevents a single overcurrent fault in the second power domain from causing an electrical fault in the first power domain.

In another example, an unmanned system is described. The unmanned system includes: one or more core systems for the unmanned system; one or more auxiliary systems for the unmanned system; a payload; and a power system. The unmanned system is configured for: providing uninterruptible power for a first power domain using the power system, the first power domain including the one or more core systems for the unmanned system; providing interruptible power for each of a second power domain and a third power domain using the power system, the second power domain including the one or more auxiliary systems for the unmanned system, and the third power domain including the payload; preventing a single overcurrent fault in the third power domain from causing an electrical fault in either the first power domain or the second power domain using first circuitry of the power system; and preventing a single overcurrent fault in the second power domain from causing an electrical fault in the first power domain using second circuitry of the power system.

In another example, a method is provided. An unmanned system is provided that includes a network, one or more auxiliary systems for the unmanned system, and a payload. The network connects the one or more auxiliary systems for the unmanned system and the payload. A network switch of the network logically separates the network into at least a second tier of communications and a third tier of communications. The network controls the unmanned system by at least: controlling the one or more auxiliary systems for the unmanned system using messages communicated by the second tier of communications, and communicating with the payload using messages communicated by the third tier of communications.

In another example, an unmanned system is described. The unmanned system includes: one or more auxiliary systems for the unmanned system; a payload; and a network having a network switch. The network connects the one or more auxiliary systems for the unmanned system and the payload. The network is logically separated into at least a second tier of communications and a third tier of communications using the network switch. The unmanned system is controlled using the network by at least: controlling the one or more auxiliary systems for the unmanned system using messages communicated by the second tier of communications, and communicating with the payload using messages communicated by the third tier of communications.

The features, functions, and advantages that have been discussed can be achieved independently in various embodiments or may be combined in yet other embodiments further details of which can be seen with reference to the following description and drawings.

BRIEF DESCRIPTION OF THE FIGURES

FIG. 6 is a flowchart of a method for controlling an unmanned system, according to an example embodiment.

FIG. 7 is a flowchart of a method for providing an unmanned system, according to an example embodiment.

FIG. 8 is a flowchart of a method for operating an unmanned system, according to an example embodiment.

FIG. 9 is a flowchart of another method for controlling an unmanned system, according to an example embodiment.

DETAILED DESCRIPTION

Figure 1:
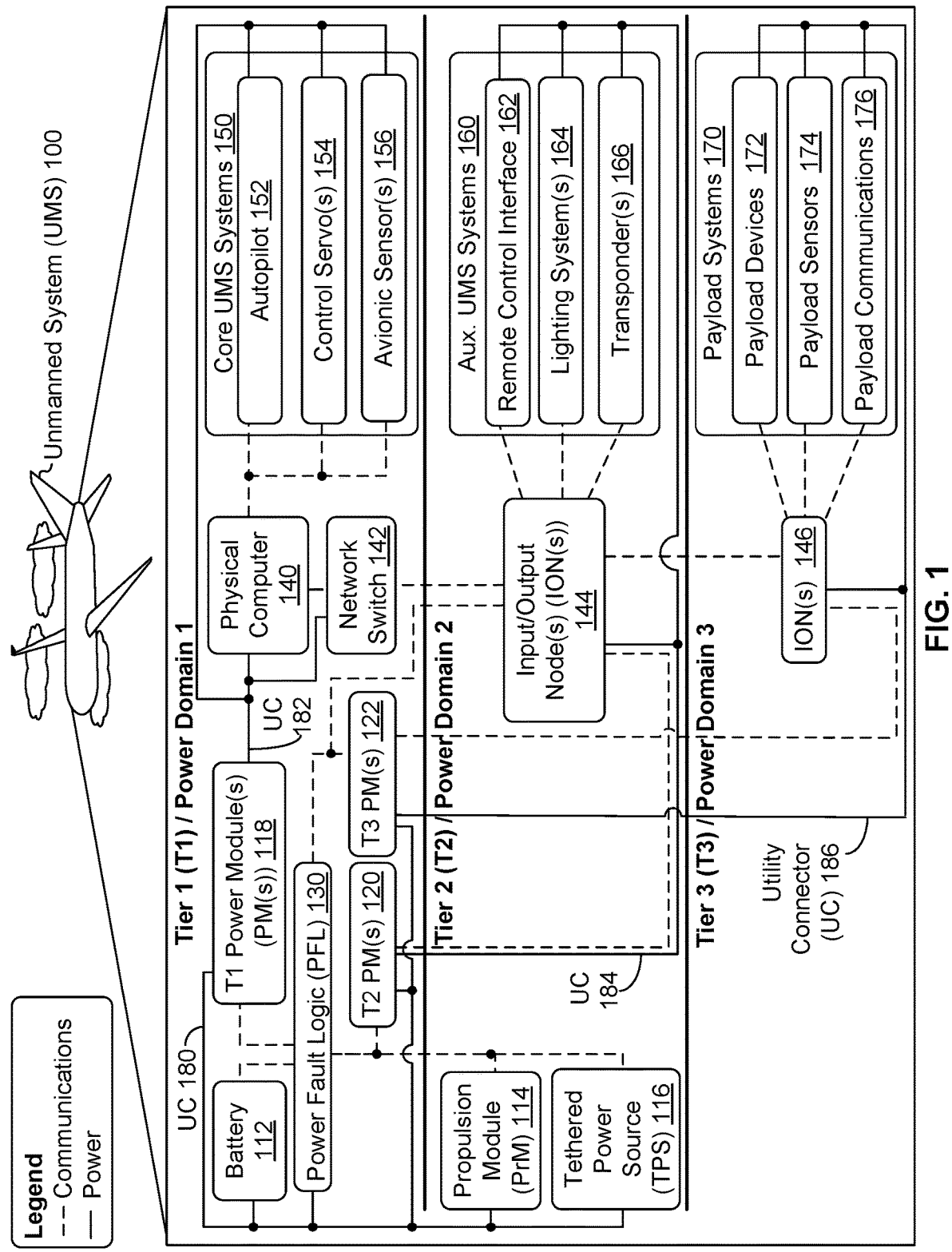
FIG. 1 is a diagram of an unmanned system, according to an example embodiment.

Herein is described an architecture for an unmanned system (UMS), such as an unmanned system, such as an aircraft, that utilizes components arranged in a unique configuration to reduce size, weight, cost, and power required to control the unmanned system. The architecture is based, for example, on several techniques:

1. Separation of networks of components of the unmanned system by criticality.

2. Maximizing use and reuse of reference design circuits within the unmanned system (and perhaps other unmanned systems).

3. Pushing input/output processing into lower-criticality networks using input/output nodes (IONs) of the unmanned system by, where the input/output nodes enable communication using widely available communications protocol(s) between input/output devices and the rest of the unmanned system.

4. Providing power protection and/or isolation of networks of components within the unmanned system using one or more common, programmable, and reusable power modules and utility connectors (UCs).

5. Reducing size, cost, power, and weight of computing components by virtualizing control computers within the unmanned system.

This architecture includes features to support scalability and wide applicability across a range of platforms and UMS controls; e.g., avionics subsystems for unmanned aircraft. For example, in an unmanned aircraft application, the architecture includes a general autopilot interface compatible with various autopilots; a general location sensor (e.g., Global Positioning System (GPS)) interface compatible with multiple receivers, a remote control/command and control (C2) interface, an extensible input/output subsystem that allows the architecture to grow and expand to meet the needs of future unmanned aircraft, and a scalable power management subsystem that can support a range of unmanned aircraft sizes. As such, the architecture can be used in a wide variety of unmanned (and perhaps manned) systems, such as vehicles and related support systems including but not limited to, fixed-wing aircraft, aircraft with rotors (e.g., quadcopters, helicopters), ground support systems for aircraft, land-based vehicles, surface-water vehicles, and underwater vehicles.

The architecture include components of the unmanned system connected by a mixed-criticality communications network that enables one physical network to safely, efficiently, and reliably handle message traffic having a variety of priorities to share the physical network. For example, an unmanned aircraft using the mixed-criticality communications network can communicate high-priority flight-critical traffic concurrent with low-priority payload traffic in a safe manner. Using one physical network in comparison with physical separation of high-priority and low-priority network traffic can significantly reduce network size, weight, cost, and power.

The architecture includes a single physical computer, perhaps having multiple cores, executing hypervisor-based software that virtualizes multiple virtual machines executing on the single physical computer to perform multiple roles used in controlling the unmanned system. For example, the single physical computer can be a system on a module (SoM) usable for managing system communications and signal prioritization. In some examples, a SoM can provide multiple computer cores that reside in a small form factor using an industry-standard interface socket design. Using the industry-standard interface socket design allows changes (e.g., upgrades or downgrades) of the single physical computer based on system requirements and/or cost drivers without impact to software and helps to extend the lifespan of the architecture before significant changes in computing hardware are required.

The hypervisor-based software includes a hypervisor that enables simultaneous operation of multiple virtual computers that can be utilized in the unmanned system. In some examples, the hypervisor can have a core-to-virtual computer allocation of one or more cores of the single physical computer for each virtual computer; while in other examples, the hypervisor can schedule execution of each virtual computer on multiple cores of the single physical computer; e.g., by scheduling time to execute software for each virtual computer on some or all of the cores of the single physical computer. The hypervisor also enables memory separation between virtual computers, thereby preventing unwanted tampering of critical systems. Development of separate virtual computers allows for maintenance of strict control over part of the system software; e.g., virtual computer software controlling core unmanned system systems, while allowing variation in other portions of system software; e.g., virtual computer software controlling payloads. Then, in this example, a change in virtual computer software controlling payloads can be isolated from the virtual computer software controlling core aspects of the unmanned system. Further, since the virtual computer software controlling payloads is isolated from the virtual computer software controlling core vehicle systems, new and/or different payloads can be designed and tested out without impacting the core vehicle systems. Other examples are possible as well.

Similar to the mixed-criticality communications network, legacy platforms can instantiate multiple physical computers in order to isolate high-priority software functions from low-priority software functions; e.g., some legacy aircraft systems use two (or more) physical computers such as a flight computer for controlling the aircraft and a payload computer for controlling a payload of the vehicle. The multiple virtual computers can effectively isolate unmanned system and payload software functions, and so can meet requirements of regulatory approval agencies. And, using the single physical computer provides significant savings in size, weight, cost, and power in comparison to the use of multiple physical computers.

The architecture enables unmanned system customization including use of various payloads; e.g., one or more payloads having sensors, communications devices, cameras/imaging systems, etc. The various unmanned system components and payload(s) can use a number of standard communications protocols; e.g., Ethernet, Transmission Control Protocol/Internet Protocol (TCP/IP), User Datagram Protocol (UDP), Controller Area Network (CAN) protocols, RS-232. Use of a number of standard communications protocols increases scope and capabilities of the architecture with minimal changes; e.g., by allowing fast swapping in of upgraded aircraft and/or payload devices that use one of the number of standard communications protocols supported by the architecture.

The architecture utilizes input/output nodes (IONs), each having a microprocessor for managing a number of analog and digital input/output interfaces for communicating with various input/output devices of the unmanned system while using multiple standard communication protocols. Example input/output devices include, but are not limited to unmanned system/vehicle control systems, unmanned system/vehicle management systems, and payload devices. In some examples, one or more input/output nodes can be included in a field swappable module (FSM) that can directly communicate with the rest of the vehicle or be added in cascade with other modules. The input/output nodes can be connected to the mixed-criticality communications network using standard communications protocols; e.g., UDP and/or TCP/IP over Ethernet. Using flexible input/output nodes that support multiple different analog and digital interfaces and communicate using multiple different protocols allows for hardware customization of devices managed by the input/output nodes with little or no software and/or hardware reconfiguration of the rest of the architecture.

The architecture includes a power system with a number of scalable power modules to provide a plurality of power domains throughout an unmanned system. The power system can receive electrical power from a number of power sources (e.g., batteries, engines/propulsion units, fuel cells) of possibly varying quality and distribute the power throughout the unmanned system. Each power module in the power system can control and measure power delivery to vehicle subsystems connected to the power module. In an aircraft example, a payload system could fail in flight and a power module connected to the power system could consequently determine that the payload system is drawing excessive power to allow the aircraft to return to base, and so immediately could stop delivering power to part or all of the payload system. The power module can include an adjustable circuit breaker function that allows software control of power provided by the power module. Additionally, power modules are arranged by the architecture to automatically protect higher-priority power domains from electrical faults in lower-priority power domains. Also, the power module can shed non-critical power in the event of a vehicle-wide power fault.

In combination, the architecture can use multiple power domains and multiple communications tiers to respectively provide power and communications with multiple vehicle systems. In some examples, the architecture can specify use of sets of at least three power domains and three related tiers of communications for controlling three "networks" or sets of vehicle systems: a tier one (T1) network of core vehicle systems (and/or other core aspects of unmanned systems), a tier two (T2) network of auxiliary vehicle systems (and/or other auxiliary aspects of unmanned systems), and a tier three (T3) network of payload systems. In other examples, an unmanned system can use more, fewer, and/or different sets of power domains and/or related tiers of communications than the T1/T2/T3 networks and related power domains mentioned above. More particularly, other example sets of power domains and/or related tiers of communications can provide power and/or communications for higher-level criticality systems (e.g., safety critical systems, security critical systems) and/or lower-level systems (e.g., maintenance systems, troubleshooting systems, training systems).

Each of the T1, T2, and T3 networks can be managed by separate virtual computers; that is, a main virtual computer can manage the T1 network, an auxiliary virtual computer can manage the T2 network, and a payload virtual computer can manage the T3 network. Each of the T1, T2, and T3 networks can be isolated with two main exceptions: the common physical computer supporting these virtual computers and one or more network switches that connect network nodes in both the T2 and T3 networks without interchanging messages between the T2 and T3 networks.

The T1 network can provide guaranteed bandwidth and uninterruptable power to core vehicle systems. In the example of an unmanned aircraft, the core vehicle systems can include an autopilot, servomechanisms (or servos for short) that move control surfaces of the unmanned aircraft, and avionics sensors. Then, position and stability controls for the unmanned aircraft are only communicated within the T1 network, thereby ensuring that C2 operations are guaranteed sufficient bandwidth, even when auxiliary vehicle systems and/or payload systems utilize a great deal of bandwidth. In this example, the core vehicle systems enable the unmanned aircraft to perform (albeit in a possibly degraded fashion) in the presence of faults in the auxiliary unmanned vehicle systems and/or the payload systems.

As a more specific example, the above-mentioned unmanned aircraft can have a remote control interface, such as a radio, for a human controller to provide C2 commands to direct the unmanned aircraft—then, the core vehicle systems enable the unmanned aircraft to maintain safe and stable operations with predetermined basic navigation even when the remote control interface fails. Also, the main virtual computer for the T1 network can recognize a loss of communications via the remote control interface and can execute emergency procedures to insure safe operation until the remote control interface is reestablished. In this way a vehicle can run self-diagnostics in the T2 network while independently maintaining safe operation of the vehicle in the T1 network. Using pre-programmed navigation data, the main virtual computer can use the emergency procedures to direct the unmanned aircraft in a predetermined manner (e.g., to fly at a predetermined altitude, speed and/or velocity; to fly to a predetermined location) without human intervention/error.

Some core vehicle systems connected to the T1 network include location sensors; e.g., GPS systems, that provide continuous or nearly-continuous location positional assessment capabilities. Location data determined by the location sensors can then be provided to the autopilot via the T1 network without interruption. The architecture can be configured so that sensors located in the T2 and/or T3 networks can provide data to the autopilot and/or other core vehicle systems. A power domain associated with the T1 network can be powered using a battery and perhaps other power sources, where the battery can automatically take over the responsibility of keeping the vehicle powered in the event of critical power faults, such as failure of a propulsion unit (i.e., engine) and/or overcurrent faults in the T2 and/or T3 networks. Then, the power system providing the power domain can detect the critical power faults and responsively switch off unnecessary power loads instantaneously, both to save power and to protect components of the T1 network.

The T2 network can provide bandwidth and interruptible power to auxiliary vehicle systems. Continuing the unmanned aircraft example mentioned in the context of the T1 network, the T2 network can include the remote control interface, lighting systems, transponders, propulsion units, tethered power sources, and perhaps other non-payload systems of the unmanned aircraft. In this example, the T2 network can route communication of C2 commands provided using the remote control interface to the T1 network without interference of other communications on the T1 network. Also, the T2 network can be designed as isolated from the T3 network, so communications within the T2 network (e.g., C2 messages and/or commands) can be unperturbed by communications within the T3 network (e.g., payload-related messages).

Communications in the T2 and/or T3 networks can be tagged with quality of service (QoS) information that enables a network switch to route the QoS-tagged communications and provide bandwidth control related to the QoS-tagged communications of the T2 and/or T3 networks. Input/output nodes can be connected to the T2 network and/or T3 network via Ethernet (or perhaps other communication protocol(s)) to allow expansion of input/output devices into any vehicle compartment. Since the input/output node supports multiple communications protocols, a new input/output device can be introduced to the T2 (or T3) network without changing the architecture.

The T3 network of an unmanned system can provide bandwidth and interruptible power to payload systems, where the T2 and T3 networks can be nearly identical electrically, but the priority of the T2 network can be higher than the T3 network and the T3 network can be isolated from the rest of the unmanned system. This allows for information related to payloads, such as video, and controls of the devices, such as camera/imaging system position, to be managed in a way that does not interfere with safe and secure operation of the unmanned system.

The herein-described architecture enables quick resolution of power, communications, and computing issues of an unmanned system. The herein-described architecture also speeds deployment, increase quality, and reduces cost of new unmanned systems, as the herein-described architecture specifies use of reusable architectural components, including a single physical computer, power modules, and input/output nodes, connected by the mixed-criticality communications network. Then, these architectural components can be designed, implemented, tested, and verified in a modular fashion, thereby enabling deployment of reliable new vehicles in a cost effective and timely manner; i.e., once verified, an architectural component can be readily introduced into as a reliable building block of a new unmanned system. The mixed-criticality communications network can be expanded to provide bandwidth to new payload (and other) components. These new components readily can be integrated to address faults and/or end of life issues of older components.

Hardware systems based on these reusable architectural components can be reconfigured to meet specific needs of a (new) unmanned system. The use of multiple tiers of communications and multiple power domains enable customized power, bandwidth, and fault management for each of a number of different networks of components within an unmanned system. Thus, the herein-described architecture can provide reliable power, bandwidth, and computing services for a variety of unmanned system platforms while saving size, weight, power, and costs over related legacy systems. Further, as the architectural components are reusable, operators of new unmanned system that use the herein-described architecture will require less training to learn about these new unmanned systems.

FIG. 1 is a diagram of an unmanned system (UMS) 100, according to an example embodiment. As indicated by FIG. 1, one example unmanned system 100 is an aircraft. Other example systems that could utilize the architecture illustrated by the diagram of FIG. 1 include, but are not limited to, unmanned and perhaps manned systems that include vehicles and related support systems including but not limited to, fixed-wing aircraft, aircraft with rotors (e.g., quadcopters, helicopters), ground support systems for aircraft, land-based vehicles, surface-water vehicles, and underwater vehicles.

Figure 2:
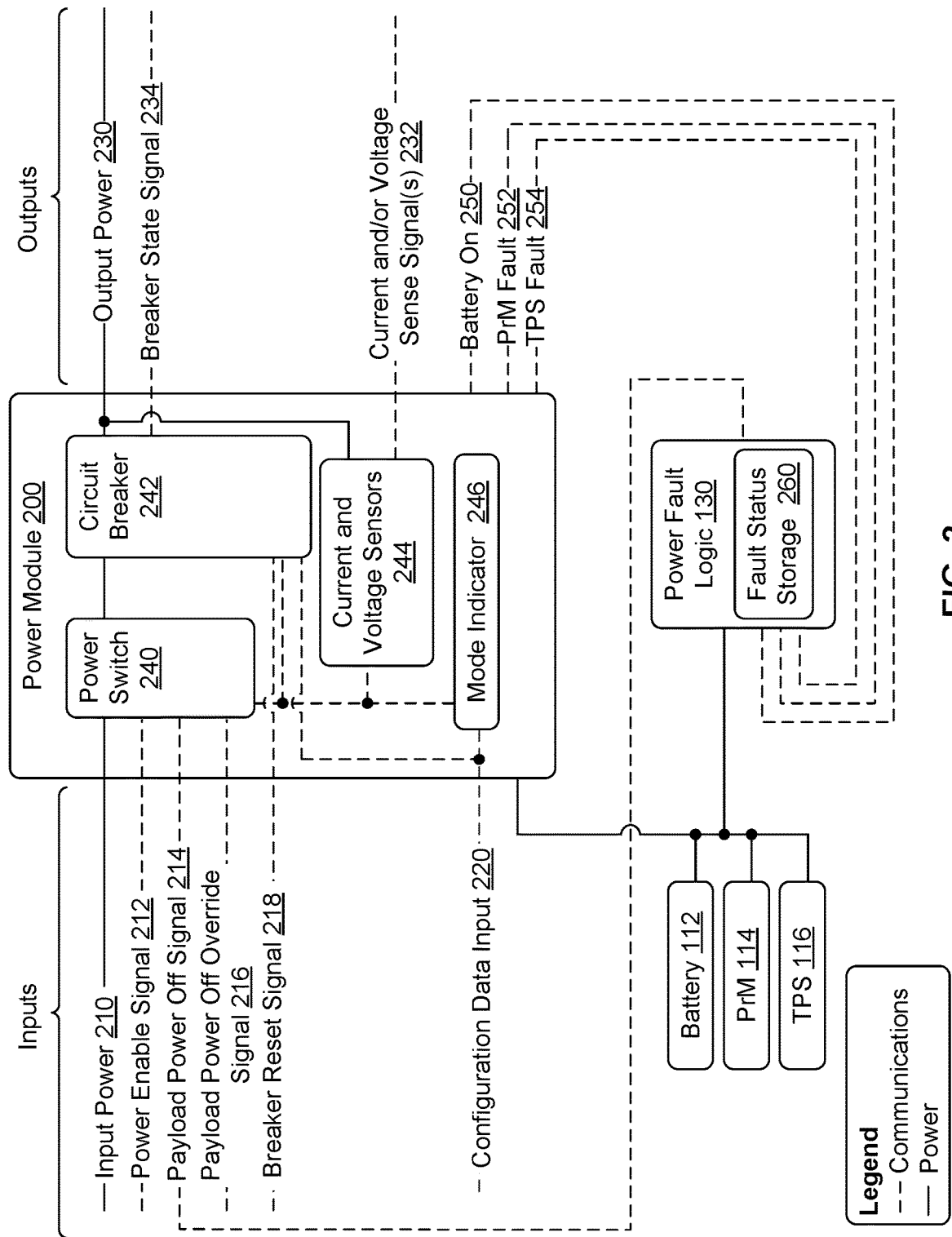
FIG. 2 is a block diagram of a portion of a power system of the unmanned system of FIG. 1, according to an example embodiment.

Unmanned system 100 includes battery 112, propulsion module (PrM) 114, tethered power source (TPS) 116, one or more tier one (T1) power modules (PMs) 118, one or more tier two (T2) power modules 120, one or more tier three (T3) power modules 122, power fault logic (PFL) 130, physical computer 140, network switch 142, one or more input/output nodes (IONs) 144 that are in T2, one or more input/output nodes (IONs) 146 that are in T3, core UMS systems 150, auxiliary UMS systems 160, and payload systems 170, which are interconnected by communications lines or links (shown using dashed lines in FIGS. 1 and 2) and power lines (shown using solid lines in FIGS. 1 and 2). The power lines include utility connectors 180, 182 for power domain 1 and T1, utility connector 184 for power domain 2 and T2, and utility connector 186 for power domain 3 and T3. In some examples, utility connectors from different criticality domains can be combined into a single physical interface Core UMS systems 150 include components that provide core functionality of unmanned system 100, such as controlled movement operations. Failure of core UMS systems 150 could result in a catastrophic condition for unmanned system 100. In an example where unmanned system 100 includes an aircraft system, a catastrophic condition would prevent continued safe flight and/or prevent a successful emergency landing, which can be referred to as Uncontrolled Flight into Terrain (UFIT). In examples where unmanned system 100 does not include an aircraft system, a catastrophic condition is a condition that may result in a fatality.

For example, core UMS systems 150 can include autopilot 152, one or more control servos 154, and one or more avionic sensors 156. Control servo(s) 154 can include one or more servos for moving control surfaces of unmanned system 100. In the example where unmanned system 100 is an aircraft, the control surfaces can include but are not limited to ailerons, elevators of horizontal stabilizer, rudders, and flaps. Avionic sensor(s) 156 can include, but are not limited to, one or more sensors for determining airspeed, pitch, pitch rate, roll, roll rate, yaw, yaw rate, acceleration, and/or inertial navigation. In other examples, core UMS systems 150 can include more, fewer, and/or different components.

Auxiliary UMS systems 160 can include components whose functionality is auxiliary to core UMS systems 150 and/or provide other functionality than core functionality for unmanned system 100. In a particular aircraft example, T2, power domain 2, and/or auxiliary UMS systems 160 can include sensors, computers and signals used for: fixing aircraft position other than inertial dead reckoning, aircraft navigation and anti-collision lighting systems, aircraft Air Traffic Control (ATC) transponder, one or more C2 data links, health and status monitoring of aircraft equipment, propulsion systems (assumes control glide landing on battery power), and/or rejection of operator inputs that exceed safe limits.

For example, auxiliary UMS systems 160 can include including remote control interface 162, one or more lighting systems 164, and one or more transponders 166. Remote control interface 162 can be used transmitting and/or receiving C2 communications, such as C2 messages and/or commands provided by a remote operator of unmanned system 100. For example, C2 messages and/or commands can be acted upon by unmanned system 100 as control messages for remotely controlling unmanned system 100. Lighting system(s) 164 can include one or more illumination sources for illuminating or lighting part or all of unmanned systems 100. In an example where unmanned system 100 is an aircraft, lighting system(s) 164 can provide illumination for wings and other aspects of the aircraft. Transponder(s) 166 can receive radio signals and automatically transmit different radio signals, such as one or more transponders for communicating with air traffic control systems. In other examples, auxiliary UMS systems 160 can include more, fewer, and/or different components.

Failure of auxiliary UMS systems 160 could result in a hazardous condition. In this example, a hazardous condition is a condition related to a reduction in safety margin, increased operator workload due to contingency procedures, or a loss of integral platform functional capabilities that are not expected to result in a fatality. In an example where unmanned system 100 includes an aircraft system, a hazardous condition may prevent a normal landing operation, but a forced emergency landing and/or a collision in a known location is the expected outcome from the failure, which can be referred to as Controlled Flight into Terrain (CFIT) event. For examples where unmanned system 100 does not include an aircraft, a hazardous condition may result in the total economic loss of unmanned system 100, but a fatality is not reasonably expected to occur due to the hazardous condition. In some examples, non-payload devices in the T2 network/power domain 2 can be configured to be either in the T2 network/power domain 2 or in the T3 network/power domain 3.

Payload systems 170 collectively can be carried by unmanned system 100 as a cargo or payload. For example, payload systems 170 can include payload devices 172, payload sensors 174, and payload communications 176. Payload devices 172 can include one or more devices carried aboard unmanned system 100 that are not core or auxiliary UMS systems. Payload sensor(s) 174 can include one or more sensors configured to measure conditions in an environment around unmanned system 100 and provide data about the measured conditions of the environment. Payload communications 176 can include one or more devices used for communicating data and perhaps control messages with payload systems 170; e.g., provide uplink and/or downlink data for communicating with payload systems 170 and perhaps other components of unmanned system 100; e.g., communicating with input/output node(s) and/or physical computer 140. In other examples, payload systems 170 can include more, fewer, and/or different components.

The data provided by payload sensor(s) 174 can include, but are not limited to: meteorological conditions including, but not limited to, wind speed, wind direction, temperature, humidity, barometric pressure, and/or rainfall; location data including, but not limited to, latitude, longitude, and/or altitude data; kinematic information (e.g., location, speed, velocity, acceleration data) related to physical computer 140 and/or network switch 142, one or more vehicles, and/or one or more aircraft, and electromagnetic radiation data (e.g., infra-red, ultraviolet, X-ray data). Payload sensor(s) 174 can include, but are not limited to, one or more: GPS sensors, location sensors, gyroscopes, accelerometers, magnetometers, video and/or still cameras/imaging systems, light sensors, infrared sensors, ultraviolet sensors, X-ray sensors, meteorological sensors, proximity sensors, vibration and/or motion sensors, heat sensors, thermometers, lasers, wind sensors, barometers, rain gauges, and microphones. In some examples, payload sensor(s) 174 can be utilized for relative position sensing, where relative position sensing provides information about aircraft velocity relative to a vehicle; e.g., using differential GPS and/or radio-based triangulation methods.

For examples where unmanned system 100 includes an aircraft, a T3 failure may result in an aborted sortie if payload activity is the purpose of the flight, but a normal landing at a normal base of operations is the expected result. For examples where unmanned system 100 does not include an aircraft, a T3 failure may result in loss of functionality disabling the system, but injury or total economic loss of the system is not expected.

In a particular aircraft example, T3, power domain 3, and/or payload systems 170 can include equipment, signals and commands used for modular payloads not required for aircraft flight including but not limited to: gimbals for positioning and stabilizing payloads, optical and infrared image capturing equipment, computers for payload stabilization, tracking algorithms and metadata tagging, transceivers for Payload Data Link with systems not on the aircraft, transceivers for ground-to-ground or air-to-ground communications relay, and other data gathering electronic equipment.

The architecture of unmanned system 100 is divided into three tiers with three related power domains, where a tier refers to communications/networking of a "network" or groups of components within unmanned system 100, and where a power domain refers to power provided to and/or received from a network of components within unmanned system 100. For example, FIG. 1 shows that a tier 1 (T1) and associated power domain 1 can respectively provide communications and power for a "T1 network" of components that include core UMS systems 150, a tier 2 and associated power domain 2 can respectively provide communications and power for a "T2 network" of components that include auxiliary UMS systems 160, and a tier 3 and associated power domain 3 can respectively provide communications and power for a "T3 network" of components that include payload systems 170.

The T1 network can provide guaranteed bandwidth and uninterruptable power to core UMS systems 150. In the example of unmanned system 100 being an unmanned aircraft, the core UMS systems 150 can include autopilot 152, one or more control servos 154 that can be used to move control surfaces of the unmanned aircraft, and one or more avionics sensors 156. Then, position and stability controls for the unmanned aircraft are only communicated within the T1 network, thereby ensuring that C2 operations are guaranteed sufficient bandwidth, even when auxiliary UMS systems 160 and/or payload systems 170 utilize a great deal of bandwidth. In this example, core UMS systems 150 enable the unmanned aircraft to perform (albeit in a possibly degraded fashion) in the presence of faults in the auxiliary unmanned vehicle systems and/or the payload systems. In this example, the unmanned aircraft can have remote control interface 162, such as a radio, for a human controller to provide C2 commands to direct the unmanned aircraft—then, core UMS systems 150 can enable the unmanned aircraft to maintain safe and stable operations with predetermined basic navigation even if remote control interface 162 fails. Also, physical computer 140 and/or network switch 142 can recognize a loss of communications via remote control interface 162 and can execute emergency procedures to insure safe operation until remote control interface 162 is reestablished. In this way, the unmanned aircraft can run self-diagnostics in the T2 network while independently maintaining safe operation of the vehicle in the T1 network. Using pre-programmed navigation data, physical computer 140 can use the emergency procedures to direct the unmanned aircraft in a predetermined manner (e.g., to fly at a predetermined altitude, speed and/or velocity; to fly to a predetermined location) without human intervention/error.

Some avionic sensor(s) 156 connected to the T1 network can include location sensors; e.g., GPS systems, that provide continuous or nearly-continuous location positional assessment capabilities. Location data determined by the location sensors of avionic sensor(s) 156 can then be provided to autopilot 152 via the T1 network without interruption. The architecture can be configured so that sensors located in the T2 and/or T3 networks can provide data to the autopilot and/or other core vehicle systems. Power domain 1 associated with the T1 network can be powered using battery 112 and perhaps other power sources, such as propulsion module 114 (i.e., an engine) and/or tethered power source 116. Battery 112 can automatically take over the responsibility of keeping the vehicle powered in the event of critical power faults, such as failure of propulsion module 114 and/or overcurrent faults in the T2 and/or T3 networks. Then, the power system providing power domain 1 can detect the critical power faults and responsively switch off unnecessary power loads instantaneously, both to save power and to protect components of the T1 network.

The T2 network and power domain 2 can respectively provide bandwidth and interruptible power to auxiliary UMS systems 160. Continuing the unmanned aircraft example mentioned in the context of the T1 network and power domain 1, the T2 network can include remote control interface 162, one or more lighting systems 164, one or more transponders 166, propulsion module 114, tethered power source 116, and perhaps other non-payload systems of the unmanned aircraft. In this example, the T2 network can route communication of C2 commands provided using the remote control interface to the T1 network without interference of other communications on the T1 network. Also, the T2 network can be designed to be isolated from the T3 network, so communications within the T2 network (e.g., C2 messages and/or commands) can be unperturbed by communications within the T3 network (e.g., payload-related messages).

Communications in the T2 and/or T3 networks can be tagged with quality of service (QoS) information that enables network switch 142 to route the QoS-tagged communications and provide bandwidth control related to the QoS-tagged communications of the T2 and/or T3 networks. Input/output nodes 144, 146 can be connected to the T2 network and T3 network respectively via Ethernet (or perhaps other communication protocol(s)) to allow expansion of input/output devices into any vehicle compartment.

The T3 network and power domain 3 of unmanned system 100 can respectively provide bandwidth and interruptible power to payload systems 170. The T2 and T3 networks can be nearly identical electrically, but the priority of the T2 network can be higher than the T3 network and the T3 network can be logically separated from the rest of unmanned system 100. Logically separated of the T3 network allows for information related to payloads, such as video, and controls of the devices, such as camera/imaging system position, to be managed in a way that does not interfere with safe and secure operation of the unmanned system.

More generally, physical computer 140 and/or network switch 142 can logically separate the T1, T2, and/or T3 networks. For example, the T2 network can have a T2 traffic threshold and the T3 network can have a T3 traffic threshold. Then, physical computer 140 and/or network switch 142 can monitor an amount of message traffic on at least the T2 (and/or T3) network(s) and if message traffic on the T2 (and/or T3) network(s) exceeds the T2 (and/or T3) traffic threshold(s), physical computer 140 and/or network switch 142 can restrict and/or block some or all message traffic on the T2 (and/or T3) network(s) until the amount of message traffic on at least the T2 (and/or T3) network(s) no longer exceeds the T2 (and/or T3) traffic threshold(s).

In some examples, one or more communication tiers can have multiple types of message traffic; e.g., T3 can have message traffic related to payload controls, and payload data, such as message traffic related video data and of message traffic related to non-video data. In these examples, physical computer 140 and/or network switch 142 can monitor an amount of each type of message traffic on the communication tier(s) that have multiple types of message traffic. Also, physical computer 140 and/or network switch 142 can maintain a per-message-type traffic threshold for the communication tier(s) that have multiple types of message traffic; e.g., a first threshold for T3 payload control message traffic, a second threshold for T3 video data message traffic, and a third threshold for T3 non-video data message traffic. Then, if message traffic on communication tier(s) that have multiple types of message traffic exceeds one or more per-message-type traffic thresholds, physical computer 140 and/or network switch 142 can restrict and/or block some or all message traffic having the type(s) of message traffic that have exceeded respective per-message-type traffic thresholds until the amount of message traffic on communication tier(s) that have multiple types of message traffic no longer exceeds the respective per-message-type traffic thresholds. For example, if payload sensors 174 are generating and sending video data messages at a rate that exceeds the second threshold, then physical computer 140 and/or network switch 142 can restrict and/or block video data message traffic in T3 until payload sensors 174 send video data messages at a rate that no longer exceeds the second threshold. Other types of thresholds and/or logical separation of communications networks/tiers by unmanned system 100 are possible as well.

A power system of unmanned system 100 can include aspects of power domains 1, 2, and 3 that provide, distribute, and/or manage electrical power of unmanned system 100. For example, FIG. 1 shows that a power system of unmanned system 100 can include power sources that include battery 112, propulsion module 114 and tethered power source 116, power modules that include T1 power module(s) 118, T2 power module(s) 120, and T3 power module(s) 122, and power fault logic 130 interconnected by power lines that include utility connectors 180, 182, 184. In some examples, physical computer 140 and/or one or more input/output nodes (e.g., input/output node(s) 144 in T2) can act as part of the power system of unmanned system 100 (e.g., provide controls, fault processing, and/or signals, related to electrical power of unmanned system 100).

In some examples, the power system can have one more power sources that can provide a predetermined amount of power (e.g., 250 watts) and at a predetermined voltage (e.g., 28 V). For example, power sources of unmanned system 100 include battery 112, propulsion module 114, and tethered power source 116. In some examples, the power system can comply with one or more standards related to power quality requirements; e.g., a MIL-STD-704F standard. In some examples, some or all of battery 112, propulsion module 114, and tethered power source 116 can provide the predetermined amount of power at the predetermined voltage and/or can comply with one or more standards related to power quality requirements.

Battery 112 can provide storage of electrical power that can be delivered at a predetermined voltage (e.g., 12V, 24V, 28V). Propulsion module 114 can provide electrical power and propulsion of unmanned system 100. Tethered power source 116 can provide electrical power from a power source external to unmanned system 100 (e.g., a generator, a power grid). In some examples, battery 112 can be charged from electrical power provided by propulsion module 114 and/or tethered power source 116.

In some examples, battery 112 can store and deliver adequate instantaneous power to maintain uninterrupted power functionality throughout power domain 1, even after an overcurrent event resulting in shut down of power domain 2 and/or power domain 3. In examples where unmanned system 100 is an aircraft, battery 112 can store and deliver adequate instantaneous power to maintain uninterrupted power functionality throughout power domain 1 to allow unmanned system 100 to land from a predetermined maximum altitude.

Each of the three tiers and power domains can represent a criticality category or severity of a potential failure within the tier or power domain. For example, T1 and power domain 1 can support the most critical components (core UMS systems 150) of unmanned system 100 and so can be assigned to a high criticality category; T2 and power domain 2 can support somewhat critical components (auxiliary UMS systems 160) of unmanned system 100 and so can be assigned to a medium criticality category; and T3 and power domain 3 can support less critical components (payload systems 170) of unmanned system 100 and can be assigned to a low criticality category. Other criticality categories are possible as well.

A power module can supply power to part or all of a power domain, isolate a higher-numbered power domain from a lower-numbered power domain, and can sense power provided to electrical loads associated with the power module. In the example illustrated in FIG. 1, T1 power module(s) 118 can provide power at least from one or more of above-mentioned power sources (battery 112, propulsion module 114, tethered power source 116) and sense the power provided to electrical loads in power domain 1, T2 power module(s) 120 can provide power at least from one or more of above-mentioned power sources and sense the power provided to electrical loads in power domain 2, and T3 power module(s) 122 can provide power at least from one or more of above-mentioned power sources and sense the power provided to electrical loads in power domain 3. Regarding power sensing, a power module can sense voltage and current delivered to electrical loads connected to the power module; in some examples, the power module can sense voltage and current independently for each connected electrical load. Also, T2 power module(s) 120 can act, perhaps in conjunction with T1 power module(s) 118, to isolate power domain 2 from power domain 1. Further, T3 power module(s) 122 can act, perhaps in conjunction with T1 power module(s) 118 and/or T2 power module(s) 120, to isolate power domain 3 from power domain 1 and power domain 2. Additional features of power modules are discussed further herein; e.g., in the context of power module 200 and FIG. 2.

Power domain 1 can provide uninterruptible power to the devices in the T1 network (or T1 devices, for short). Uninterruptible power is considered to power provided to a device D when device D is protected from single point failures in the power system so that device D continues to receive power after occurrence of such single point failures.

T1 devices can connect to power domain 1 directly; that is, no input current limit devices or circuit breakers have to be employed for connecting T1 devices to power domain 1. In aircraft examples of unmanned system 100, an autopilot, such as autopilot 152, can be a non-redundant T1 device attached directly to power domain 1; e.g., via utility connector 182. In some examples, a T1 device can connect to power domain 1 using a voltage regulator. In some examples, utility connector 182 for power domain 1 can support at least a predetermined percentage (e.g., 150%, 200%, 225%) of expected power provided by power sources of unmanned system 100 (e.g., battery 112, propulsion module 114, tethered power source 116), where the predetermined percentage is greater than 100%. In some examples, communications links enabling communication between components of the T1 network can support at least a predetermined percentage (e.g., 200%, 300%, 512%) of expected bandwidth, where the predetermined percentage is greater than 100%.

Some T1 devices can be redundant devices; that is, if one of a group of redundant devices fails and at least one device in the group of redundant devices remains active, then the active redundant device(s) in the group of redundant devices can at least partially carry out the functions of the failed redundant device. As an example, a group of servomechanisms can act as a group of redundant devices to perform the functionality of control servo(s) 154 to move control surfaces of unmanned system 100; e.g., to move inner and outer wing surfaces of an aircraft. Then, if a group of redundant devices are connected to power domain 1, power domain 1 can include power fault protection features so that a short-to-ground fault at one of the group of redundant devices does not negatively impact the power delivered to the rest of the group of redundant devices.

The power system can provide "criticality firewalls" or power protection devices, including but not limited to, power modules 118, 120, 122, power fault logic (PFL) 130, circuit breakers, current limiters, and voltage regulators, to prevent any single overcurrent fault on a higher numbered power domain from negatively impacting operations of a lower numbered power domain higher criticality circuit net. For example, the power system can prevent a single overcurrent fault in power domain 2 from negatively impacting operations of power domain 1, but power domain 3 may be negatively affected by the single overcurrent fault in power domain 2.

A criticality firewall can operate autonomously and automatically (that is, without software interaction, with a possible exception for configuring data of the criticality firewall) that is sized for worst-case loads and not respond to harmless transients loads. The criticality of a criticality firewall is equal to the highest criticality system (i.e., lowest number tier and/or power domain) that it touches, since failure of the criticality firewall could expose a higher-criticality system to a fault in the lower-criticality system. For example a circuit breaker acting as a criticality firewall connecting T1 power to a T3 load protects T1 power and is therefore a T1 criticality firewall. In some examples, a power domain can be partitioned using criticality firewalls to contain the impact of potential faults; e.g., power domain 2 can be partitioned using criticality firewalls to protect individual components of the T2 network, such as separately protecting remote control interface 162, lighting systems 164, and transponders 166 using criticality firewalls The power system of unmanned system 100 can protect a malfunction of one power source, such as one of battery 112, propulsion module 114, tethered power source 116, from causing malfunctions on another power source. In an example of unmanned system 100 as depicted in FIG. 1, the power system of unmanned system 100 can protect a malfunction in propulsion module 114's ability to provide electrical power from causing electrical damage to either battery 112 or tethered power source 116. If one power source fails (e.g., due to malfunction), power module 200 can detect the failure using current and voltage sensors 244 and signal the failure so that the power system can responsively switch to another working power source.

In some examples, switching between power sources can occur substantially instantaneously; e.g., within a power-switching threshold of time, such 20 microseconds, 100 microseconds, 500 microseconds, 1000 microseconds, 2500 microseconds, or 10000 microseconds. In some examples, tethered power source 116 and/or propulsion module 114 can be disconnected by the power system when a reverse polarity voltage or an overvoltage condition is detected for tethered power source 116 and/or propulsion module 114.

Power fault logic 130 can receive and store data about power-fault related signals, so that input/output node 144 can retrieve the data about power-fault related signals, and provide data about the power-fault related signals to physical computer 140 for software processing. Table 1 below provides example functionality that can be provided by power fault logic (e.g., power fault logic 130 and perhaps other components) of the power system of unmanned system 100.

TABLE 1

| Detected Fault | Payload Power Off Signal 214 Action | Source Connection Action | Information Delivered to Power Fault Logic 130 and Input/Output Node 144 |
| --- | --- | --- | --- |
| Overvoltage or reverse voltage for power from propulsion module 114 | Switch to valid power source | Disconnect propulsion module 114 until power cycle or reset by input/output node 144 | Propulsion module 114 disconnect state data |

TABLE 1-continued

| Detected Fault | Payload Power Off Signal 214 Action | Source Connection Action | Information Delivered to Power Fault Logic 130 and Input/Output Node 144 |
|---|---|---|---|
| Overvoltage or reverse voltage for power from tethered power source 116 | Switch to valid power source | Disconnect tethered power source 116 until power cycle or reset by input/output node 144 | Tethered power source 116 disconnect state data |
| Overcurrent for power from propulsion module 114 | Assert payload power off signal 214 | Leave propulsion module 114 connected | Propulsion module 114 overcurrent fault data |
| Overcurrent for power from tethered power source 116 | Assert payload power off signal 214 | Leave tethered power source 116 connected | Tethered power source 116 overcurrent fault data |
| Undervoltage for power from propulsion module 114 | Switch to valid power source | Switch to valid power source | Low voltage data (for detection by input/output node 144). |
| Undervoltage for power from tethered power source 116 | Switch to valid power source | Switch to next-lowest voltage source | Low voltage data (for detection by input/output node 144). |
| Use of battery 112 | Assert payload power off signal 214 | N/A | Assert |

As indicated by Table 1 above, an undervoltage fault event or an overvoltage fault event can cause disconnection of a power source; e.g., undervoltage or overvoltage from power provided by either propulsion module 114 or tethered power source 116.

In some embodiments, a power module (e.g., T2 power module(s) 120, T3 power module(s) 122) and/or an input/output node (e.g., input/output node 144 operating in the T2 network, input/output node 146 operating in the T3 network) can subsequently reconnect a previously-disconnected power source after a fault event condition has cleared. As also indicated by Table 1 above, overcurrent fault events do not cause disconnection of power sources; rather, overcurrent fault events can cause assertion of payload power off signal 214.

The power system of unmanned system 100 can have a user interface (not depicted in FIG. 1) that can be used to signal faults, power interruptions, power source malfunctions, and other failure conditions; e.g., using one or more alarm indications. Then, the user interface can display and/or otherwise provide the alarm indications to an operator, technician, or other user having access to the user interface. The user interface also can have functionality to enable a user to control connections of electrical loads in unmanned system 100 following one or more signal faults, power interruptions, power source malfunctions, and/or other failure conditions.

In other examples, more, fewer, and/or different tiers, power domains, and/or criticality categories can be utilized by unmanned system 100. As a more specific example, unmanned system 100 can include a tier 4 and related power domain 4 that includes a "T4 network" of components that provide one or more training and/or simulation capabilities and/or can include a tier 5 and related power domain 5 that includes a "T5 network" of components that provide one or more maintenance, diagnostic, and/or trouble shooting capabilities.

Components within unmanned system 100 can be connected and powered via utility connectors or unique item connectors, whichever is convenient for space constraints. As such, utility connectors can provide flexibility to reuse equipment in a variety of platforms or locations within a single platform. Unique connectors can be point optimized for exact pinouts and minimum size and weight.

FIG. 2 is a block diagram of a portion of the power system of unmanned system 100, according to an example embodiment. The portion of the power system of unmanned system 100 illustrated in FIG. 2 includes power module 200, power fault logic 130, and power sources including battery 112, propulsion module 114, and tethered power source 116 interconnected by communications lines or links (shown using dashed lines in FIGS. 1 and 2) and power lines (shown using solid lines in FIGS. 1 and 2).

Power module 200 is a programmable circuit block capable of providing current sensing, circuit breaker functionality, circuit breaker reset functionality, controllable power enable/disable functionality, criticality firewall functionality, and state reporting functionality. In some examples, one power module 200 can perform some or all of the tasks of any one of power modules 118, 120, 122. For example, when performing as one of T1 power module(s) 118, power module 200 can provide uninterruptable, high quality power for power domain 1/for components of the T1 network and can protect components of the T1 network from one or more electrical faults; e.g. overcurrent faults. When performing as one of power module(s) 120 or power module(s) 122, power module 200 can provide high quality power for power domain 2 or power domain 3, respectively and can act as a criticality firewall to protect a lower-numbered power domain; e.g., while performing as one of power module(s) 120 in power domain 2, the power module can act as a criticality firewall to protect a power domain 1 from power faults; e.g., overcurrent faults.

Power module 200 includes power switch 240, circuit breaker 242, current and voltage sensors 244, and mode indicator 246. Power switch 240 includes a controllable switch that can be switched either to allow or to interrupt power flow through power module 200; e.g., power flow from input power 210 to output power 230. In some examples, upon reception of a power enable signal; e.g., power enable signal 212, power flow through power module 200 can be enabled.

In some examples, power module 200 can include data for an adjustable threshold OverCurrThresh that indicates a percentage of maximum allowable power detected by circuit breaker 242 of power module 200 before asserting an overcurrent fault. For example, the threshold OverCurrThresh can be adjusted to a value between 0 and 100% of maximum allowable power supported by a utility connector (e.g., utility connector 184 for the T2 network). If circuit breaker 242 detects that input power 210 exceeds OverCurrThresh then power module 200 can signal that an overcurrent fault has been detected. In some examples, OverCurrThresh can be set to one of a maximum number of threshold level values; e.g., the maximum number of threshold level values can be 2, 10, 16, 32, 64, 100, 128, 256, or a larger number.

Circuit breaker 242 includes one or more devices (e.g., circuit breakers, fuses) for stopping power flow through power module 200 as a safety measure; e.g., stopping power flow through power module 200 in case of an overcurrent fault and/or one or more other faults detected by power module 200. In usual operation, circuit breaker 242 stays in a breaker-closed state where circuit breaker 242 allows power flow through power module 200 until a fault is detected. When circuit breaker 242 detects a fault, circuit breaker 242 can be set or changed from the breaker-closed state to a breaker-open state where circuit breaker 242 stops power flow through power module 200. After circuit breaker 242 is set to the breaker-open state, circuit breaker 242 can receive a reset signal; e.g., breaker reset signal 218. After reception of the reset signal, circuit breaker 242 can be reset or changed from the breaker-open state to the breaker-closed state. However, a subsequent overcurrent fault detected by circuit breaker 242 can cause circuit breaker 242 to again be set to the breaker-open state; i.e., the reset signal does not override fault protection capabilities leading to stopping power flow.

Power module 200 can use current and voltage sensors 244 to sense or detect voltage and current delivered to electrical loads connected to power module 200. Current and voltage sensors 244 can include voltage sensors, current sensors, and/or other electrical sensors to measure current, voltage, and perhaps other characteristics of power flow through power module 200 and provide data related to the measured current, voltage, and perhaps other characteristics of power as current and/or voltage sense signals 232.

For example, power module 200 can use current and voltage sensors 244 to determine a current and/or a voltage related to power provided by each power source of unmanned system 100. Then, a power source providing power at a predetermined voltage (e.g., 28 V) and/or at a predetermined current, perhaps within a predetermined range of voltages and/or within a predetermined range of currents, can be considered a valid power source. However, a power source providing power at a different voltage and/or current than the predetermined voltage and/or current (or outside of the predetermined range of voltages and/or the predetermined range of currents) can be considered an invalid power source. Then, power module 200 can switch as necessary from obtaining power from an invalid power source to obtaining power only from a valid power source.

As another example, the data related to the measured current provided in current and/or voltage sense signals 232 can include a signal proportional to the sensed current through the circuit, where the signal can range from a minimum voltage or current value to represent a minimum percentage of expected current to a maximum voltage or current value to represent a maximum percentage of expected current; e.g., a minimum voltage of 0 V or a minimum current of 4 milli-amperes (mA) representing a minimum percentage of expected current of 0%, and a maximum voltage of 3 V or a maximum current of 20 mA representing a maximum percentage of expected current of 150%. Other minimum voltage, maximum voltage, minimum current, maximum current, minimum percentage of expected current, and/or maximum percentage of expected current values are possible as well.

As another example, current and voltage sensors 244 can provide current and/or voltage sense signals 232 that include data related to the measured voltage, where the data can include a signal proportional to the sensed voltage through the circuit. The signal proportional to the sensed voltage can range from a minimum voltage (or current) value to represent a minimum percentage of expected voltage to a maximum current value to represent a maximum percentage of expected voltage; e.g., a minimum voltage of 0 V or a minimum current of 4 mA representing a minimum percentage of expected voltage of 0%, and a maximum voltage of 3 V or a maximum current of 20 mA representing a maximum percentage of expected voltage of 125%. Other minimum current, maximum current, minimum voltage, maximum voltage, minimum percentage of expected voltage, and/or maximum percentage of expected voltage values are possible as well.

In some examples, power module 200 can provide current and/or voltage sense signals 232 as analog and/or digital information to a herein-described input/output node. Then, the input/output node can convert the analog information to digital information, packetize the digital information (both digital information as received and as converted), and communicate the resulting packets of digital information; e.g., to physical computer 140.

Mode indicator 246 is a programmable indicator that stores mode data for power module 200, where the mode data can be provided using configuration data input 220. The mode data can indicate an operating mode of power module 200 related to a power domain where power module is being used. For example, the mode data can indicate that power module 200 is in one of three operating modes: an operating mode of "S" or "T1" for power module 200 operating in power domain 1 for the T1 network, an operating mode of "B" or "T2" for power module 200 operating in power domain 2 for the T2 network, or an operating mode of "P" or "T3" can be used for power module 200 operating in power domain 3 for the T3 network. Other operating modes and/or mode data are possible as well. In examples where unmanned system 100 is an aircraft, mode indicator 246 and/or other data related to the power system may have an interlock that inhibits changing of mode indicator 246 and/or other data related to the power system in flight.

FIG. 2 illustrates that power module 200 can receive one or more inputs and provide one or more outputs. For example, the inputs to power module 200 can include input power 210, power enable signal 212, payload power off signal 214, payload power off override signal 216, breaker reset signal 218, and configuration data input 220. And, in this example, the outputs of power module 200 can include output power 230, current and/or voltage sense signals 232, and breaker state signal 234. In a more particular example, input power 210 can be uninterruptable power provided at 28 V, output power 230 can be interruptible power provided at 28 V, power enable signal 212 can be a digital signal indicating whether power should be output by power module 200, payload power off signal 214 can be a digital signal indicating whether power should be output by power module 200 to T3 components/components in power domain 3, payload power off override signal 214 can be a digital signal indicating whether power should be output by power module 200 to T3 components/components in power domain 3 even if payload power off signal 214 is active, configuration data input 220 can be a digital signal providing mode data and/or other data used for configuring power module 200, current and/or voltage sense signals 232 can be digital and/or analog signals indicating current, voltage, and/or other characteristics of power provided to one or more electrical loads connected to power module 200, and breaker state signal 234 can be a digital signal indicating a state (e.g., breaker-open or breaker-closed) state of circuit breaker 242. More, fewer, and/or different inputs and/or outputs to and/or from power module 200 are possible as well.

In some examples, some of the inputs shown in FIG. 2 can be ignored based on an operating mode of power module 200. For example, a power module operating in the "S" or "T1" operating mode can ignore power enable signal 212, payload power off signal 214, payload power off override signal 216, and breaker reset signal 218. As another example, a power module operating in the "B" or "T2" operating mode can ignore payload power off signal 214 and payload power off override signal 216. Continuing this example, a power module operating in the "P" or "T3" operating mode may not ignore any inputs, including power enable signal 212, payload power off signal 214, payload power off override signal 216, and breaker reset signal 218.

In some examples, electrical loads (such as auxiliary UMS systems 160) can be attached to power domain 2 only by way of a power module operating with the "B" or "T2" operating mode; e.g., each of power module(s) 120 can have mode data of mode indicator 246 indicating the "B" or "T2" operating mode. In related examples, electrical loads (such as payload systems 170) can be attached to power domain 3 only by way of a power module operating with the "P" or "T3" operating mode; e.g., each of power module(s) 122 can have mode data of mode indicator 246 indicating the "P" or "T3" operating mode. In other related examples, a power connection to a component of the T1 network that also connects to component(s) of the T2 and/or T3 networks can be attached to the power system only by way of a power module operating with the "S" or "T1" operating mode; e.g., each of T1 power module(s) 118 can have mode data of mode indicator 246 indicating the "S" or "T1" operating mode.

In some examples, reception of payload power off signal 214 can cause power module 200 to stop power flow through power module 200. However, payload power off signal 214 can be ignored (i.e., power can flow through power module 200) upon reception of payload power off override signal 216 even if payload power off signal 214 is still being provided. However, payload power off override signal 216 does not inhibit stoppage of power flow through power module 200 if circuit breaker 242 detects a fault and therefore is in the breaker-open state.

Power fault logic 130 can include logic circuitry, software, and/or other circuitry to store and signal faults within the power system of unmanned system 100. Signaling of faults can include, but is not limited to payload power off signal 214, payload power off override signal 216, and/or breaker reset signal 218. In particular, power fault logic can signal payload power off signal 214 upon detection of one or more of the following conditions: an overcurrent condition for electrical power provided from propulsion module 114, an overcurrent condition for electrical power provided from propulsion module 114, tethered power source 116, a condition where battery 112 is providing electrical power for the power system, or a condition where a virtual computer for the T2 network is being reset. Other conditions for signaling payload power off signal 214 are possible as well.

Power fault logic 130 can also store fault information in fault status storage 260. Fault status storage 260 can record a status of fault events/fault conditions in the power system of unmanned system 100. For example, fault status storage can include one or more latches or other storage devices to store status (e.g., asserted or de-asserted) of one or more fault-related signals, including but not limited to, payload power off signal 214, battery on signal 250, propulsion module (PrM) fault signal 252, and tethered power system (TPS) fault signal 254. In some examples, power module 200 and/or an input/output node (e.g., input/output node 144 operating in the T2 network) can read the fault information stored in fault status storage 260 to determine current fault conditions (if any) present within the power system of unmanned system 100. In some examples, some or all of the status data in fault status storage 260 can be remotely reset or cleared to indicate a de-asserted status; e.g., to clear stored fault condition data once one or more fault conditions have been corrected.

Power module 200 can be controlled by an external device ED, such as physical computer 140 and/or an input/output node, such as one or more of input/output nodes 144, 146. Such controls can depend on the operating mode of power module 200. For example, if power module 200 is operating with the "P" or "T3" operating mode, current and voltage sensors 244 can sense current, voltage, and/or other electrical characteristics of power provided to ED, and ED enable or disable power module 200 from providing output power 230 by respectively asserting or de-asserting power enable signal 212. Also, ED can receive state information about circuit breaker 242 (e.g., breaker-open and/or breaker-closed state information) by way of breaker state signal 234, and if necessary, reset circuit breaker 242 from a breaker-open state to a breaker-closed state by asserting breaker reset signal 218. ED can also cause a system wide shut down of the T3 network by asserting payload power off signal 214. Upon reception of the asserted payload power off signal 214, power module 200 can stop providing output power 230, regardless of power enable signal 212 and a state of circuit breaker 242. However, if a particular power module in the T3 network is to continue providing output power even during system wide shut down of the T3 network, then ED can assert payload power off override signal 216 to cause the particular power module to ignore or override an asserted payload power off signal 214.

As another example, if power module 200 is operating with the "B" or "T2" operating mode, current and voltage sensors 244 can sense current, voltage, and/or other electrical characteristics of power provided to ED, and ED enable or disable power module 200 from providing output power 230 by respectively asserting or de-asserting power enable signal 212. Also, ED can receive state information about circuit breaker 242 (e.g., breaker-open and/or breaker-closed state information) by way of breaker state signal 234, and if necessary, reset circuit breaker 242 from a breaker-open state to a breaker-closed state by asserting breaker reset signal 218. However, while in the "B" or "T2" operating mode, power module 200 ignores payload power off signal 214 and payload power off override signal 216; thus, power module 200 in the "B" or "T2" operating mode, presumably operating in the T2 network, does not participate in a system wide shut down of the T3 network.

As another example, if power module 200 is operating with the "S" or "T1" operating mode, current and voltage sensors 244 can sense current, voltage, and/or other electrical characteristics of power provided to ED. However, while in the "S" or "T1" operating mode, power module 200 ignores power enable signal 212, payload power off signal 214, payload power off override signal 216; and breaker reset signal 218, and circuit breaker 242 may be disabled. Thus, power module 200 in the "S" or "T1" operating mode, presumably operating in the T1 network, only provides and senses uninterruptable power without providing circuit breaker capabilities, controllable power (power on/off) functionality, or participating in a system wide shut down of the T3 network.

As indicated above, each operating mode of power module 200 can be associated with particular set of functions. If power module 200 is operating with the "S" or "T1" operating mode, current and voltage sensors 244 can use a first set of functions that include a function for providing input power 210 as output power 230 to an external device ED and a function for sensing output power 230 provided to ED using current and voltage sensors 244 to generate current and/or voltage sense signal(s) 232. If power module 200 is operating with the "B" or "T2" operating mode, power module 200 can use a second set of functions that can include the first set of functions as well as a circuit breaking function using circuit breaker 242 for output power 230 provided for ED, and a power on/off function using power on/off switch 240 triggered at least by power enable signal 212 for output power 230 provided for ED. If power module 200 is operating with the "P" or "T3" operating mode, power module 200 can use a third set of functions that can include the second set of functions as well as a function for powering down a payload (e.g., payload systems 170) using power on/off switch 240 triggered at least by payload power off signal 214 and/or payload power off override signal 216 in response to a power fault. As such, power module 200 can be configured to provide at least all of the third set of functions, but can provide fewer functions in operation based on the operating mode.

Figure 3:
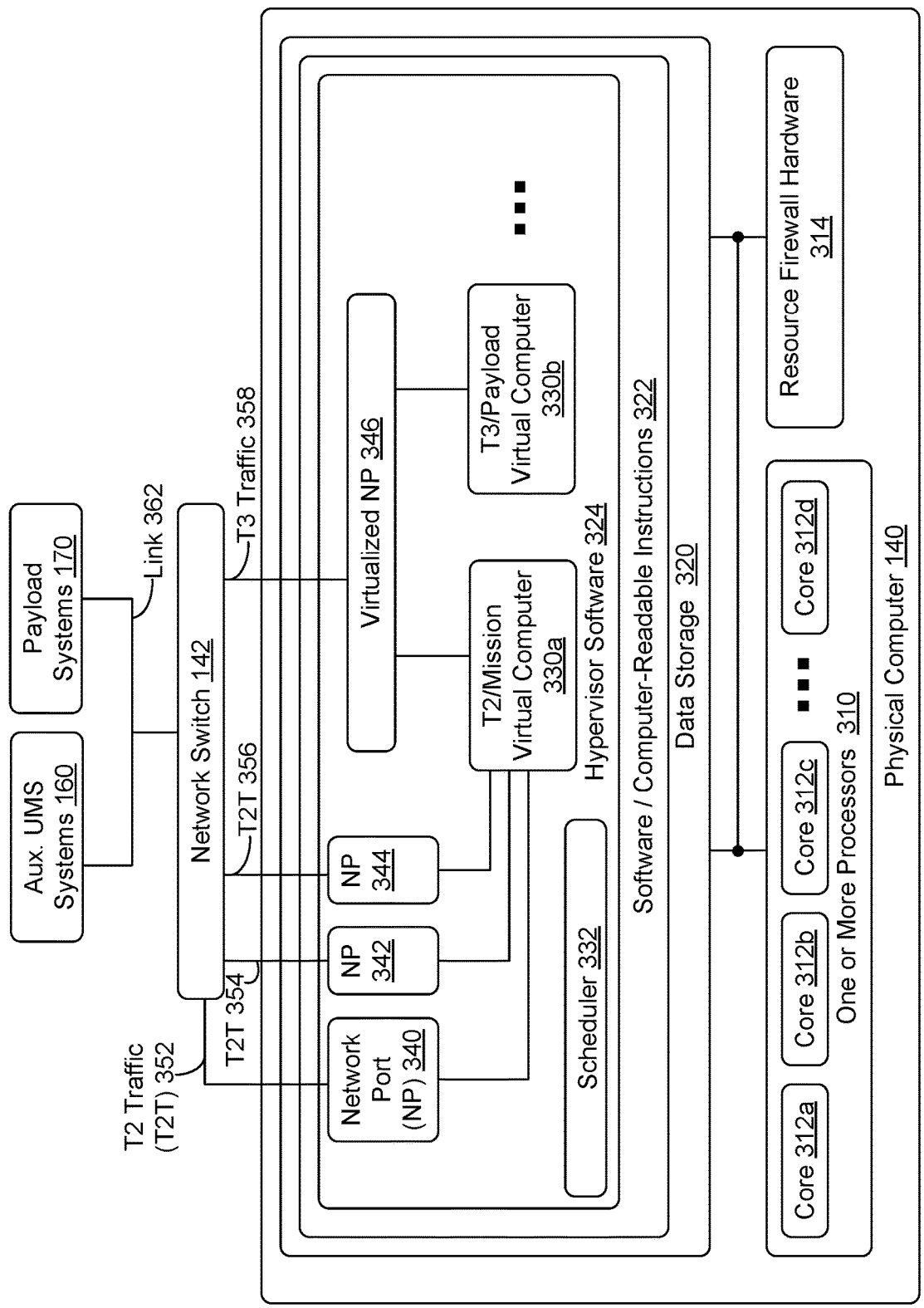
FIG. 3 is a block diagram of a communications network of the unmanned system of FIG. 1, according to an example embodiment.

FIG. 3 is a block diagram of a communications network of unmanned system 100, according to an example embodiment. The communications network of FIG. 3 is closely related to the communications network of FIG. 4—differences between the two communications networks are discussed below in more detail in the context of FIG. 4.

Figure 4:
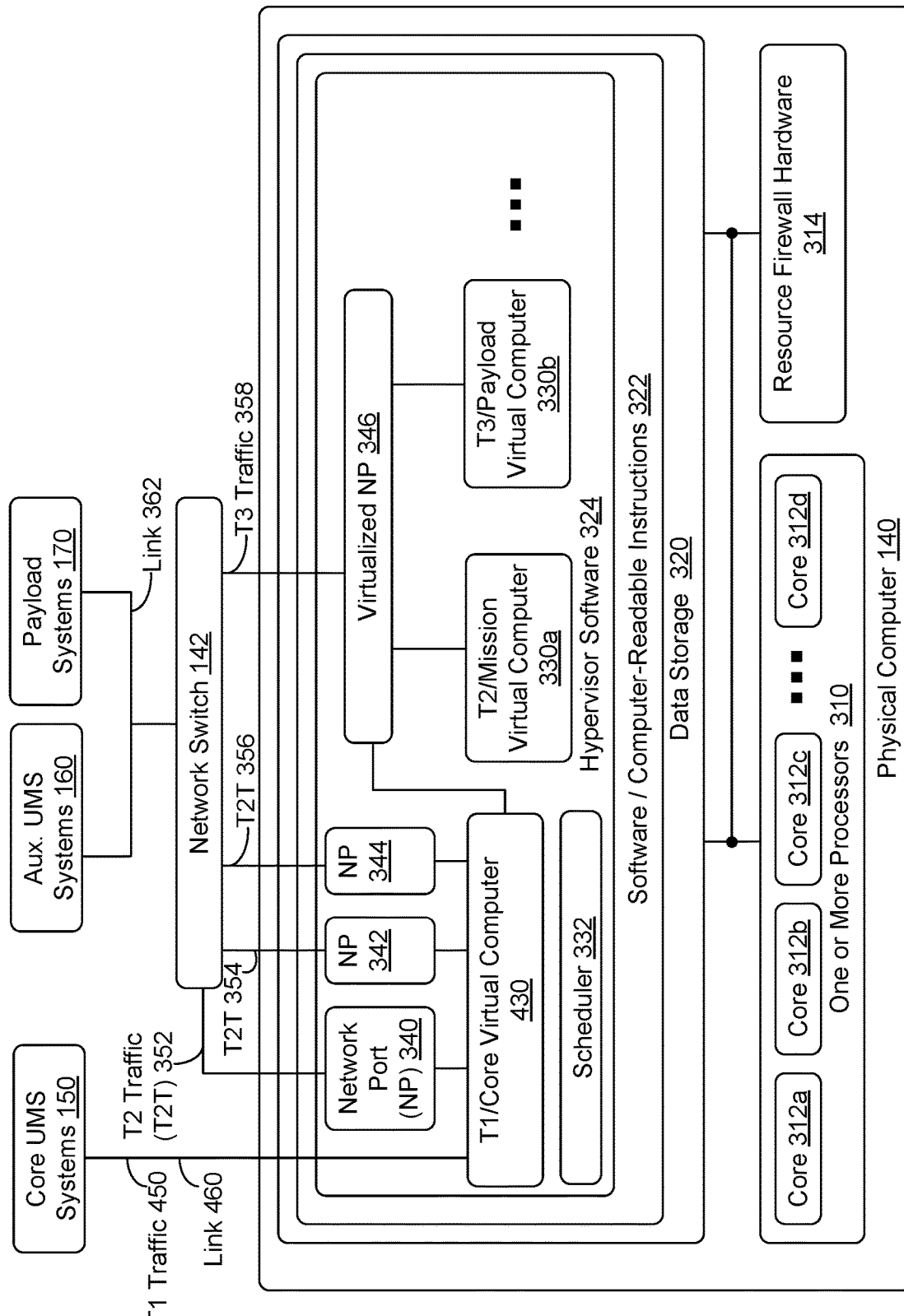
FIG. 4 is a block diagram of another communications network of the unmanned system of FIG. 1, according to an example embodiment.

Both the communications network shown in FIG. 3 and the communications network shown in FIG. 4 include physical computer 140, network switch 142, core UMS systems 150, auxiliary UMS systems 160, and payload systems 170. Generally, physical computer 140 and/or network switch 142 can be implemented using any hardware device or system capable of running software/computer-readable instructions that cause the hardware device or system to perform the herein-described functionality of physical computer 140 and/or network switch 142. Other components can vary from the illustrative examples shown in FIGS. 3 and 4.

FIG. 3 shows that link 362 carries communications between physical computer 140, auxiliary UMS systems 160, and payload systems 170, where these communications are shown in FIG. 3 as respective T2 traffic (T2T) 352, 354, 356 and T3 traffic 358, via network switch 142. In other examples, a common link can carry T2 traffic 352, 354, 356, and T3 traffic 358. Other components can vary from the illustrative examples shown in FIGS. 3 and 4. Generally, physical computer 140 (or network switch 142) can be implemented using any hardware device or system capable of running software/computer-readable instructions that cause the hardware device or system to perform the herein-described functionality of physical computer 140 (or network switch 142).

Physical computer 140 includes one or more processors 310, resource firewall hardware 314, and data storage 320 linked together via a system bus, network, or other connection mechanism. In some examples, some or all of the herein-described functionality of resource firewall hardware 314 is provided by other components of communications network of unmanned system 100; e.g., by hardware and/or software associated with one or more processors 310 and/or data storage 320.

One or more processors 310 can include multiple cores 312a, 312b, 312c . . . 312d. In some examples, processor(s) 310 can be one multi-core processor with all of cores 312a, 312b, 312c . . . 312d—then each core can be an individual processing unit of the one multi-core processor. In other examples, processor(s) 310 can have multiple processors, where each of the multiple processors can either be a single core processor or a multi-core processor, and so the multiple processors can collectively provide cores 312a, 312b, 312c . . . 312d. As such, each of processor(s) 310 can include one or more of cores 312a, 312b, 312c . . . 312d.

Each of processor(s) 310 and each of cores 312a, 312b, 312c . . . 312d, can include at least one central processing unit, computer processor, mobile processor, digital signal processor (DSP), graphics processing unit (GPU), microprocessor, computer chip, programmable processor, and/or other processing unit configured to execute software computer-readable instructions, such as software/computer-readable instructions 322 stored in data storage 320, and process data. That is, each of processor(s) 310 and each of cores 312a, 312b, 312c . . . 312d can be configured to execute software/computer-readable instructions 322 and/or other instructions as described herein.

Data storage 320 includes one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device includes hardware that is capable of storing information; for example, data, computer-readable program instructions, and/or other suitable information on a temporary basis and/or a permanent basis. Data storage 320 can include one or more physical and/or non-transitory storage devices with at least enough combined storage capacity to contain software/computer-readable instructions 322 and any associated/related data structures. In some embodiments, some or all of data storage 320 can be removable, such as a removable hard drive, removable disk, or flash memory.

Along with storage capacity for software/computer-readable instructions 322, data storage 320 can include any storage required, respectively, to perform at least part of the herein-described functionality of physical computer 140. Computer-readable instructions 322 can include instructions that when executed by processor(s) 310 to perform functions, including but not limited to herein-described functionality of software, displays, and/or user interfaces. For example, computer-readable instructions 322 can include instructions that when executed by processor(s) 310, cause physical computer 140 to perform some or all of the herein-described functionality associated with a physical computer, a hypervisor/hypervisor software, a virtual computer, a power domain, a network port, and communications related to the T1, T2, and/or T3 networks.

Software/computer-readable instructions 322 can include hypervisor software 324, which, when executed by processor(s) 310, can instantiate multiple virtualized computers (i.e., hardware instances), such as but not limited to, T2/mission virtual computer 330a and T3/payload virtual computer 330b. T2/mission virtual computer 330a can control auxiliary UMS systems 160 to provide auxiliary functionality for unmanned system 100, and T3/payload virtual computer 330b can control payload systems 170 to provide payload-related functionality for unmanned system 100. In some examples, hypervisor software 324 can provide more, fewer, and/or different virtual computers than virtual computers 330a and 330b. In some examples, T2/mission virtual computer 330a can control auxiliary UMS systems 160 using UMS control messages for controlling unmanned system 100, where the UMS control messages can be provided at least in part as C2 messages and/or commands communicated using remote control interface 162.

Resource firewall hardware 314 can provide resource firewalling functionality for unmanned system 100. Resource firewalling functionality can relate to limiting access of processor cores to memory and I/O allocated to those processor cores. For example, resource firewall hardware 314 can include memory management hardware for preventing tasks running on a particular core of processor(s) 310 from assessing memory regions assigned to other cores of processor(s) 310 and/or related hardware for preventing a low criticality core from accessing higher criticality input/output devices and/or networks.

More specifically, resource firewalling functionality can include, but is not limited to, such as access control related to data storage 320 and/or input/output devices, such as input/output devices accessible via one or more input/output nodes. For example, resource firewall hardware 314 can prevent a task running on one core from accessing memory assigned to other tasks and/or cores; e.g., resource firewall hardware 314 can prevent a task TASK1A running on core 312a from accessing memory allocated to a task TASK1B assigned to core 312b and/or from accessing memory allocated to a different task TASK2A also assigned to core 312a. As another example, resource firewall hardware 314 can be used to ensure that a lower criticality task and/or core does not have access to one or more input/output devices in a higher criticality domain; e.g., a task or core associated with T3 does not have access to an input/output device of T1 or T2; a task or core associated with T2 does have access to input/output devices of T2 and perhaps T3, but does not have access to input/output devices of T1.

In some examples, resource firewall hardware 314 can include one or more memory, network, and/or I/O controllers. In some examples, resource firewall hardware 314 can also include firmware and/or software for performing In some examples, resource firewall hardware 314 can provide other functionality related to data storage 320, including but not limited to, functionality for: refreshing RAM of data storage 320, enabling and/or speeding up read and/or write access to data stored in data storage 320, buffering data transferred between processor(s) 310 and data storage, additionally managing and/or controlling hardware of data storage 320, and/or additionally enabling and/or controlling flow of data going to and/or coming from data storage 320. In some examples, some or all of resource firewall hardware 314 can reside in other hardware platforms than physical hardware 140; e.g., hardware of an input/output node, hardware of data storage 320.

In addition to virtual computers 330a, 330b, hypervisor software 324 can provide at least the additional capabilities: core assignment (assignment of virtual machines to cores of physical computer 140), interrupt handling including routing interrupt messages to virtual computers, execution scheduling of virtual computers 330a, 330b using scheduler 332, memory space separation between virtual computers 330a, 330b, device handling (device separation, sharing, and/or assignment) for input/output and/or other devices connected to physical computer 140 and/or network switch 142, and secure application support. In some examples, hypervisor software 324 can include LynxSecure™ Separation Kernel Hypervisor software from Lynx Software Technologies, Inc.

In some examples, one virtual computer can control one or more other virtual computers. For example, T2/mission virtual computer 330a can start, restart, and stop T3/payload virtual computer 330b. If T2/mission virtual computer 330a stops another virtual computer; e.g., T3/payload virtual computer 330b, then the stopped virtual computer ceases executing software until the stopped virtual computer is restarted; i.e., by T2/mission virtual computer 330a. In particular examples, a default condition for T3/payload virtual computer 330b can be the stopped condition; that is, T2/mission virtual computer 330a has to actively start execution of T3/payload virtual computer 330b. In some examples, a virtual computer associated with a lower-numbered communication tier/network can control a virtual computer associated with a higher-numbered communication tier/network, but not vice versa; e.g., T2/mission virtual computer 330a can start, restart, and stop T3/payload virtual computer 330b, but T2/mission virtual computer 330a cannot be started, restarted, and/or stopped by T3/payload virtual computer 330b.

In some examples, cores of processor(s) 310 can be mapped to virtual computers; that is, a core is mapped or allocated to exclusive execution of software for a particular virtual computer. As a more particular example, core 312a can be mapped to T2/mission virtual computer 330a, and core 312b can be mapped to T3/payload virtual computer 330b. By mapping cores to virtual computers, computing hardware resources (cores) can be allocated to virtual computers ensuring that virtual computers always have access to the computing hardware resources. Other mapping examples are possible as well. In some examples, hypervisor software 324 can instantiate one virtual computer per core of processor(s) 310—in the specific example shown in FIG. 3, hypervisor software 324 can instantiate four virtual computers: one for each of cores 312a, 312b, 312c, and 312d.

In other examples, virtual computers may or may not be mapped to cores; rather, virtual computers can be scheduled by scheduler 332 to execute on one or more cores of processor(s) 310 for a "time slot" or maximum predetermined amount of time (e.g., 500 microseconds, 1 millisecond, 2 milliseconds, 100 milliseconds). For example, scheduler 332 can use a round robin scheduling policy to provide time slots for executing each virtual computer on one or more cores designated for use by the executing virtual computer. In some of these examples, an amount of time represented by a time slot can depend on the virtual computer; e.g., a time slot for T2/mission virtual computer 330a can be 1 unit of time long, while a different time slot for T3/payload virtual computer 330b can be 2 units of time long, under the assumption that providing mission functionality will take less computing resources than providing payload functionality. In other examples where providing mission functionality takes more computing resources than providing payload functionality, a time slot for T2/mission virtual computer 330*a* can be 2 units of time long, while a time slot for T3/payload virtual computer 330*b* can be 1 unit of time long. Many other examples of time slot determination are possible as well.

As part of instantiating a virtual computer, hypervisor software 324 can allocate a portion of data storage 320 (e.g., 100 megabytes (MB), 1 gigabyte (GB), 3 GB, 100 GB, etc.) for the use of the instantiated virtual computer. Hypervisor software 324 can also enforce other resource limits on virtual computers than memory allocation limits. For example, hypervisor software 324, perhaps using scheduler 332, can ensure that a lower-numbered tier's virtual computer is not interrupted from executing beyond a predefined maximum amount of time by execution of a higher-numbered tier's virtual computer. More specifically, hypervisor software 324 can ensure that T2/mission virtual computer 330*a* is not interrupted from executing beyond a predefined maximum amount of time (e.g., 1 millisecond, 2 milliseconds, 10 milliseconds) by execution of T3/payload virtual computer 330*b*, where the interrupted from execution could arise due to usage of processor(s) 310, input/output access, memory access, software and/or hardware faults, memory operations (e.g., memory allocation, deallocation, paging, etc.), rebooting, and/or due to other reasons.

Hypervisor software 324 can also ensure that data, communications, and/or other resources are not shared between communications tiers/networks and that faults and/or other problematic behavior do not propagate between communications tiers/networks. For example, hypervisor software 324 can ensure that the T2 network is not accessible to T3/payload virtual computer 330*b* operating in T3. In some examples, resource firewall hardware 314 and/or one or more criticality firewalls can be used along with hypervisor software 324 to provide resource firewalling to ensure that faults, incorrect memory and/or input/output device accesses, and/or other problematic behavior do not propagate between communications tiers/networks.

Each virtual computer 330*a*, 330*b*, 430 can run an operating system; e.g., a Linux®-based operating system, a Microsoft® Windows® operating system, an Android™ operating system, etc. In some examples, all of virtual computers 330*a*, 330*b*, 430 can run the same operating system; while in other examples, virtual computers 330*a*, 330*b*, 430 can run two or more different operating systems.

Hypervisor software 324 can assign devices to virtual computers; e.g., assign auxiliary UMS systems 160 and related fault and interrupt information to T2/mission virtual computer 330*a*, and/or assign payload systems 170 and related fault and interrupt information to T3/payload virtual computer 330*b*. In some of these examples, most, if not all, commonly used hardware can be assigned to one virtual computer; e.g., T2/mission virtual computer 330*a*.

Hypervisor software 324 can provide virtualized access to some devices across multiple virtual computers as well; e.g., network switch 142. For example, FIG. 3 shows that hypervisor software 324 includes four network ports (NPs) 340, 342, 344, 346 for accessing network switch 142, and through link 362, auxiliary UMS systems 160 and payload systems 170. Network ports 340, 342, 344 are directly assigned to T2/mission virtual computer 330*a* to communicate messages to the T2 network using respective T2 traffic 352, 354, 356. Network port 346 is a virtualized network port that is accessible to both T2/mission virtual computer 330*a* and T3/payload virtual computer 330*b*. Then, T2/mission virtual computer 330*a* and T3/payload virtual computer 330*b* can utilize network port 346 to provide T3 traffic 358 to payload systems by way of link 362.

By providing four network ports 340, 342, 344, 346, hypervisor software 324 supports four separate communications grids to auxiliary UMS systems 160 and payload systems 170—three of these communications grids are within the T2 network with auxiliary UMS systems 160 and one communication grid is within the T3 network with payload systems 170. A first of the T2 communications grids can be used for communications (e.g., T2 traffic 352) between T2/mission virtual computer 330*a* and remote control interface 162. A second of the T2 communications grids can be used for communications (e.g., T2 traffic 354) between T2/mission virtual computer 330*a* and input/output devices and/or input/output nodes in the T2 network. A third of the T2 communications grids can be used for communications (e.g., T2 traffic 356) between T2/mission virtual computer 330*a* and a ground equipment network. The T3 communications grid can be used to connect T2/mission virtual computer 330*a* and T3/payload virtual computer 330*b* with payload systems 170, including but not limited to, remote payload communications (e.g., uplink and/or downlink communications) devices of payload systems 170 as part or all of T3 traffic 358.

In other examples, T2/mission virtual computer 330*a* does not have access to virtualized network port 346, and therefore does not have direct access to the T3 network, including T3 traffic 358. Rather, T2/mission virtual computer 330*a* can have a link to T2/mission virtual computer 330*a*, which can provide indirect access to the T3 network, including T3 traffic 358 for T3/payload virtual computer 330*b*. Linking T2/mission virtual computer 330*a* to T3/payload virtual computer 330*b* rather than to the T3 network can provide a level of security by protecting the higher criticality T2/mission virtual computer 330*a* from unintended behavior of devices on the T3 network.

In some examples, physical computer 140 can have one or more user interface components, network-communication interface components, and/or sensors. The user interface component(s) can include one or more components that can receive input and/or provide output, perhaps to a user. Example user interface component(s) that can receive input and/or provide output to and/or from a user and/or other entities include but are not limited to: a keyboard, a keypad, a touch screen, a touch pad, a computer mouse, a track ball, a joystick, a button. cathode ray tubes (CRTs), liquid crystal displays (LCDs), light emitting diodes (LEDs), displays using digital light processing (DLP) technology, printers, light bulbs, a speaker, speaker jack, audio output port, audio output device, earphones, and one or more components for generating haptic output.

The network-communication interface component(s) can be configured to send and receive data over one or more wireless interfaces and/or one or more wired interfaces to a data or other communications network; e.g., the network-communication interface component(s) can be used by physical computer 140 to communicate with network switch 142, core UMS systems 150, auxiliary UMS systems 160, payload systems 170, and perhaps other devices. The wireless interface(s) if present, can utilize an air interface, such as a Bluetooth®, ZigBee®, Wi-Fi™ and/or WiMAX™ interface to a data network, such as a wide area network (WAN), a local area network (LAN), one or more public data networks (e.g., the Internet), one or more private data networks, or any combination of public and private data networks. The wired interface(s), if present, can comprise a wire, cable, fiber-optic link and/or similar physical connection to a data network, such as a WAN, a LAN, one or more public data networks, such as the Internet, one or more private data networks, or any combination of such networks. In some examples, the network-communication interface component(s) can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

In examples where physical computer 140 has one or more sensors, the sensor(s) can be configured to measure conditions in an environment around physical computer 140 and/or network switch 142 and provide data about the measured conditions of the environment, such as, but not limited to sensors and data discussed above in the context of avionic sensor(s) 156 and payload sensor(s) 174.

FIG. 4 is another block diagram of a communications network of unmanned system 100, according to an example embodiment. The communications network of FIG. 4 is closely related to the communications network of FIG. 3. The main difference between the communications network of FIG. 3 and the communications network of FIG. 4 is that T1 communications are supported by the communications network of FIG. 4, but T1 communications are not supported by the communications network of FIG. 3. The discussion below of the communications network of FIG. 4 is intended to highlight these differences—commonly-numbered items depicted in the communications networks of FIGS. 3 and 4 not discussed in the context of the communications network of FIG. 4 have the same functionality as discussed above in the context of the communications network of FIG. 3.

FIG. 4 shows that physical computer 140 is directly connected to core UMS systems 150 via link 460. Link 460 carries communications, shown in FIG. 4 as T1 traffic 450, between physical computer 140 and core UMS systems 150. Links 362 and 460 are separate physical links. Use of separate links 362 and 460 ensures that sufficient bandwidth is available (via link 460) for T1 traffic 450, no matter how much bandwidth is utilized (via link 362) to convey T2 traffic 352, 354, 356, and T3 traffic 358. In other examples, a common link can carry T1 traffic 450, T2 traffic 352, 354, 356, and T3 traffic 358.

Software/computer-readable instructions 322 can include hypervisor software 324, which, when executed by processor(s) 310, can instantiate multiple virtualized computers (i.e., hardware instances), such as but not limited to, T1/main virtual computer 430, T2/mission virtual computer 330a, and T3/payload virtual computer 330b. T1/main virtual computer 430 can control core UMS systems 150 in the T1 network to support core functionality for unmanned system 100. In other examples, hypervisor software 324 can provide more, fewer, and/or different virtual computers than virtual computers 330a, 330b, 430. In addition to virtual computers 330a, 330b, 430, hypervisor software 324 can provide at least the additional capabilities of hypervisor software 324 discussed above in the context of FIG. 3.

In some examples, T1/main virtual computer 430 can control one or more other virtual computers. For example, T1/main virtual computer 430 can start, restart, and stop T2/mission virtual computer 330a and/or T3/payload virtual computer 330b. If T1/main virtual computer 430 stops another virtual computer; e.g., T2/mission virtual computer 330a, then the stopped virtual computer ceases executing software until the stopped virtual computer is started by T1/main virtual computer 430. In particular examples, a default condition for each of T2/mission virtual computer 330a and T3/payload virtual computer 330b can be the stopped condition; that is, T1/main virtual computer 430 has to actively start execution of T2/mission virtual computer 330a and T3/payload virtual computer 330b. In some examples, a virtual computer associated with a lower-numbered communication tier/network can control a virtual computer associated with a higher-numbered communication tier/network, but not vice versa; e.g., T1/main virtual computer 430 can start, restart, and stop T2/mission virtual computer 330a and/or T3/payload virtual computer 330b, but T1/main virtual computer 430 cannot be started, restarted, and/or stopped by either T2/mission virtual computer 330a or T3/payload virtual computer 330b.

In some examples, cores of processor(s) 310 can be mapped to virtual computers; that is, a core is mapped or allocated to exclusive execution of software for a particular virtual computer. As a more particular example, core 312a can be mapped to T1/main virtual computer 430, core 312b can be mapped to T2/mission virtual computer 330a, and core 312c can be mapped to T3/payload virtual computer 330b. Other mapping examples are possible as well.

As mentioned above, scheduler 332 can use a round robin scheduling policy to provide a time slot for executing each virtual computer on one or more cores designated for use by the executing virtual computer. In some of these examples, an amount of time represented by a time slot can depend on the virtual computer; e.g., a time slot for T1/main virtual computer 430 can be 1 unit of time long, while separate time slots for each of T2/mission virtual computer 330a and T3/payload virtual computer 330b can be 2 units of time long, under the assumption that providing core functionality will take less computing resources providing mission functionality or providing payload functionality. In other examples where providing core functionality takes more computing resources than providing mission functionality or providing payload functionality, a time slot for T1/main virtual computer 430 can be 2 units of time long, while separate time slots for each of T2/mission virtual computer 330a and T3/payload virtual computer 330b can each be 1 units of time long. Many other examples of time slot determination are possible as well.

In other examples, virtual computers may or may not be mapped to cores; rather, virtual computers can be scheduled by scheduler 332 to execute on one or more cores of processor(s) 310 for a "time slot" or maximum predetermined amount of time (e.g., 500 microseconds, 1 millisecond, 2 milliseconds, 100 milliseconds). For example, scheduler 332 can use a round robin scheduling policy to provide a time slot for executing each virtual computer on one or more cores designated for use by the executing virtual computer. In some of these examples, an amount of time represented by a time slot can depend on the virtual computer; e.g., a time slot for T2/mission virtual computer 330a can be 1 unit of time long, while a time slots for T3/payload virtual computer 330b can be 2 units of time long, under the assumption that providing mission functionality will take less computing resources than providing payload functionality. In other examples where providing mission functionality takes more computing resources than providing payload functionality, a time slot for T2/mission virtual computer 330a can be 2 units of time long, while a time slots for T3/payload virtual computer 330b can be 1 unit of time long. Many other examples of time slot amounts of time are possible as well.

In some examples, hypervisor software 324, perhaps using scheduler 332, can ensure that a lower-numbered tier's virtual computer is not interrupted from executing beyond a predefined maximum amount of time by execution of a higher-numbered tier's virtual computer. More specifically, hypervisor software 324 can ensure that T1/main virtual computer 430 is not interrupted from executing beyond a predefined maximum amount of time (e.g., 1 millisecond, 2 milliseconds, 10 milliseconds) by execution of T2/mission virtual computer 330a or by execution of T3/payload virtual computer 330b, where the interrupted from execution could arise due to usage of processor(s) 310, input/output access, memory access, software and/or hardware faults, memory operations (e.g., memory allocation, deallocation, paging, etc.), rebooting, and/or due to other reasons.

Hypervisor software 324 can assign devices to virtual computers; e.g., assign core UMS systems 150 and related fault and interrupt information to T1/main virtual computer 430. In some of these examples, most, if not all, commonly used hardware can be assigned to T1/main virtual computer 430.

Hypervisor software 324 can also ensure that data, communications, and/or other resources are not shared between communications tiers/networks and that faults and/or other problematic behavior do not propagate between communications tiers/networks. For example, hypervisor software 324 can ensure that the T1 network is not accessible to T2/mission virtual computer 330a operating in T2 or T3/payload virtual computer 330b.

Hypervisor software 324 can provide virtualized access to some devices across multiple virtual computers as well; e.g., network switch 142. For example, FIG. 4 shows that hypervisor software 324 includes four network ports 340, 342, 344, 346 for accessing network switch 142, and through link 362, auxiliary UMS systems 160 and payload systems 170. Network ports 340, 342, 344 are directly assigned to T1/main virtual computer 430 to communicate messages to the T2 network using respective T2 traffic 352, 354, 356. Network port 346 is a virtualized network port that is accessible to each of T1/main virtual computer 430, T2/mission virtual computer 330a, and T3/payload virtual computer 330b. Then, each of T1/main virtual computer 430, T2/mission virtual computer 330a, and T3/payload virtual computer 330b can utilize network port 346 to provide T3 traffic 358 to payload systems using link 362.

By providing four network ports 340, 342, 344, 346, hypervisor software 324 supports four separate communications grids to auxiliary UMS systems 160 and payload systems 170—three of these communications grids are within the T2 network with auxiliary UMS systems 160 and one communication grid is within the T3 network with payload systems 170. A first of the T2 communications grids can be used for communications (e.g., T2 traffic 352) between T1/main virtual computer 430 and remote control interface 162. A second of the T2 communications grids can be used for communications (e.g., T2 traffic 354) between T1/main virtual computer 430 and input/output devices and/or input/output nodes in the T2 network. A third of the T2 communications grids can be used for communications (e.g., T2 traffic 356) between T1/main virtual computer 430 and a ground equipment network. The T3 communications grid can be used to connect T1/main virtual computer 430, T2/mission virtual computer 330a, T3/payload virtual computer 330b with payload systems 170, including but not limited to, remote payload communications devices (e.g., uplink and/or downlink communications devices) of payload systems 170 as part or all of T3 traffic 358.

In other examples, T1/main virtual computer 430 does not have access to virtualized network port 346, and therefore does not have direct access to the T3 network, including T3 traffic 358. Rather, T1/main virtual computer 430 can have a link to T2/mission virtual computer 330a, which can provide indirect access to the T3 network, including T3 traffic 358 for T1/main virtual computer 430. Linking T1/main virtual computer 430 to T2/mission virtual computer 330a rather than to the T3 network can provide a level of security by protecting the higher criticality T1/main virtual computer 430 from unintended behavior of devices on the T3 network.

Figure 5:
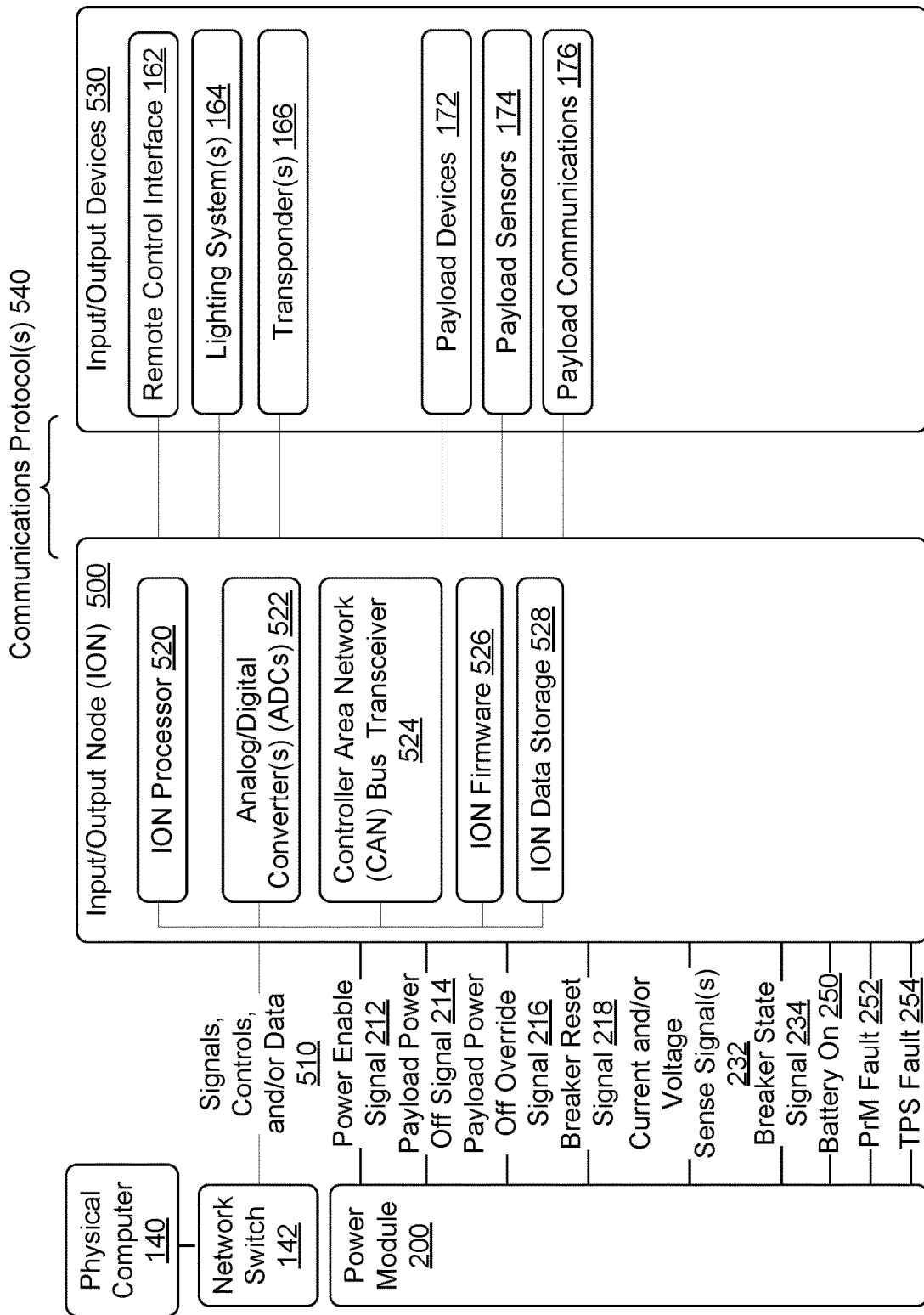
FIG. 5 is a block diagram illustrating an input/output node of the unmanned system of FIG. 1, according to an example embodiment.

FIG. 5 is a block diagram illustrating input/output node 500 of unmanned system 100, according to an example embodiment. For example, in unmanned system 100, one input/output node 500 can perform the tasks of one input/output node of one or more input/output nodes 144 or one input/output node of one or more input/output node(s) 146.

An input/output node, such as input/output node 500, can connect to and receive digital and/or analog signals from input/output devices. The digital and/or analog signals can be processed and transmitted input/output node to the physical computer using one or more communications protocols 540 (e.g., communications protocols such as, but not limited to, Ethernet, TCP/IP, UDP, CAN protocols, and RS-232). In some examples, input/output nodes can be connected together (e.g., "daisy chained") to provide additional capacity to communicate with input/output devices. Use of input/output nodes by unmanned system 100 can provide access to a wide range of input/output devices in a scalable manner.

Input/output node 500 can include one or more ION processors 520, one or more analog to digital converters (ADCs) 522, one or more controller area network (CAN) bus transceivers 524, and ION data storage 528. In some examples, ION processor 520 can include a micro-controller configured to act as an interface between input/output devices 530 and a network communicating signals, controls, and/or data 510 to network switch 142.

ION data storage 528 can include firmware, software, and/or data; e.g., ION firmware 526 executable by ION processor 520 to perform some or all of the herein-described functionality of input/output node 500. In some examples, ION firmware 526 can be stored in storage that is separate from ION data storage 528; e.g., ION firmware 526 can be stored in a read-only memory (ROM) and/or solid state device (SSD) memory that is separate from ION data storage 528.

Input/output node 500 can provide analog and digital connections for communication with input/output devices 530 using communications protocols 540. Input/output node 500 can receive signals from input/output devices 530, packetize the received signals, and send the packetized signals to physical computer 140, network switch 142, and/or power module 200. Input/output node 500 can receive packetized signals to physical computer 140, network switch 142, and/or power module 200, convert the packetized signals into analog and/or digital signals as needed, and send the packetized signals and/or the analog and/or digital signals to input/output devices 530, packetize the received signals.

FIG. 5 illustrates that examples of input/output devices 530 include, but are not limited to, remote control interface 162, one or more lighting systems 164, one or more transponders 166, one or more payload devices 172, one or more payload sensors 174, and one or more devices for payload communications 176. The packetized signals can include one or more packets transmitted as signals, controls, and/or data 510 from input/output node 500 to physical computer 140 via network switch 142. In some examples, the one or more packets can include one or more Ethernet packets that comply with an IEEE 802.3 (or similar) protocol to provide at least a predetermined amount of bandwidth (e.g., 10 megabits per second (Mbps), 100 Mbps, 1 gigabit per second (Gbps)) between input/output node 500 and network switch 142 As such, input/output node 500 can decouple input/output processing of unmanned system 100 from the digital and analog input/output pins available on physical computer 140 and/or network switch 142.

In some examples, input/output node 500 can include one or more digital ports, one or more network ports, one or more CAN bus ports, one or more Universal Asynchronous Receiver/Transmitters (UARTs), and/or one or more digital-to-analog (DAC) converters. In particular of these examples, some or all of the digital port(s) can be configurable as input ports or as output ports. In particular of these examples, the CAN bus port(s) and the one or more CAN bus transceivers 524 can support a CAN bus rate of at least 10 kilobits per second (kbps). In particular of these examples, the CAN bus port(s) can be bidirectional and are configurable to be individually enabled/disabled. In other examples, input/output node 500 can support Pulse Width Modulation (PWM) inputs and/or outputs.

Input/output node 500 can receive data signals from power module 200; e.g., input/output node 500 can current and/or voltage sense signal(s) 232. In some examples, input/output node 500 can receive, process, and generate signals related to power system faults. For example, input/output node 500 can receive, process, and/or generate one or more of power enable signal 212, payload power off signal 214, payload power off override signal 216, breaker reset signal 218, breaker state signal 234, battery on signal 250, propulsion module fault signal 252, and tethered power system fault signal 254. More specifically, input/output node 500 can initialize a power module, such as power module 200 by providing an asserted power enable signal 212, a de-asserted payload power off signal 214, and a de-asserted payload power off override signal 216.

Input/output node 500 can receive data about the signals related to power system faults from power module 200, fault status storage 260 of power fault logic 130, and/or other sources. For example, input/output node 500 can receive breaker state signal 234 from power module 200 and/or corresponding data from fault status storage 260 of power fault logic 130 regarding a state of circuit breaker 242 of power module 200. Then, if the received state of state of circuit breaker 242 is a breaker-open state, input/output node 500 can examine data related to power system faults (e.g., data related to battery on signal 250, propulsion module fault signal 252, and/or tethered power system fault signal 254) and/or other information to determine whether circuit breaker 242 can be reset to a breaker-closed state. If input/output node 500 then determines that the circuit breaker 242 can be reset to the breaker-closed state, input/output node 500 can generate an asserted breaker reset signal 218, which power module 200 can receive and responsively reset circuit breaker 242 to the breaker-closed state.

As another example, input/output node 500 can receive battery on signal 250 from power module 200 and/or corresponding data from fault status storage 260 of power fault logic 130 regarding an on or off status for battery 112. If the received battery on signal 250 is asserted, input/output node 500 can determine that battery 112 is on and infer that a relatively large power fault has occurred, so that payload systems 170 should be powered down. In this event, input/output node 500 can assert payload power off signal 214, which power module 200 can receive and responsively power down payload systems 170. In some of these examples, power module 200 can be associated with a payload system that should remained powered up even when battery 112 is on; in these examples, input/output node 500 can determine that power module 200 is associated with a payload system that should remained powered up, and assert both payload power off signal 214 and payload power off override signal 216 to override the general payload power off signal 214 for the payload system that should remained powered up.

In some examples, physical computer 140 can receive, process, and generate signals related to power system faults in a similar fashion as described for input/output node 500. Other examples of input/output node 500 and/or physical computer 140 receiving, processing, and generating signals related to power system faults are possible as well.

In some examples, one or more personality modules can be utilized within unmanned system 100 to enable remapping(s) of connector pins to a selected set of available signal types on an input/output node, such as input/output node 500. A personality module can be a small, removable circuit board that attaches to a connector on an input/output node, thereby enabling the input/output node to support of multiple configurations of equipment attached at a given connector (e.g., by installing appropriate personality module(s) for a given configuration of equipment.

FIG. 6 is a flowchart of method 600 for controlling an unmanned system, according to an example embodiment. Method 600 is executable by an unmanned system, such as unmanned system 100 described herein.

FIG. 6 indicates that method 600 begins at block 610, where the unmanned system can be provided; the unmanned system including a physical computer, one or more auxiliary systems for the UMS, and a payload, such as discussed herein in the context at least of FIGS. 1, 3, and 4.

In some examples, providing the unmanned system can include providing an autopilot and one or more servos for controlling one or more flight control surfaces of the unmanned system as part of one or more core systems for the unmanned system, such as discussed herein in the context at least of FIG. 1.

At block 620, the physical computer of the unmanned system can execute software that causes the physical computer at least to instantiate a plurality of virtual computers that include a mission virtual computer and a payload virtual computer, where the mission virtual computer and a payload virtual computer can be for: controlling the one or more auxiliary systems for the unmanned system using the mission virtual computer, communicating with the payload using the payload virtual computer, determining whether a software fault has occurred on one virtual computer of the plurality of virtual computers, and after determining that a software fault has occurred on one virtual computer of the plurality of virtual computers, preventing the software fault from causing a fault on a different virtual computer of the plurality of virtual computers, such as discussed herein in the context at least of FIGS. 3 and 4.

In some examples, executing software on the physical computer additionally can be for: sending a stop command to terminate software execution to the payload virtual computer; and after sending the stop command, sending a start command to initiate software execution to the payload virtual computer, such as discussed herein in the context at least of FIGS. 3 and 4.

In some examples, controlling the one or more auxiliary systems for the unmanned system using the mission virtual computer can include controlling the one or more auxiliary systems for the unmanned system using the mission virtual computer using a second tier of communications between the physical computer and the one or more auxiliary systems for the unmanned system, where the second tier of communications utilizes a second link; where communicating with the payload using the payload virtual computer includes communicating with the payload using a third tier of communications between the physical computer and the payload, where the third tier of communications utilizes the second link; and where the second tier of communications is inaccessible to the payload, such as discussed herein in the context at least of FIGS. 3 and 4. In some of these examples, the plurality of virtual computers can further include a core virtual computer that uses a first tier of communications and method 600 can further include: communicating with one or more core systems for the unmanned system using the first tier of communications by at least communicating position and stability control messages between the core virtual computer and the one or more core systems for the unmanned system using the first tier of communications, such as discussed herein in the context at least of FIG. 4. In some of these examples, the one or more auxiliary systems for the unmanned system can include a remote control interface, and controlling the one or more auxiliary systems for the unmanned system using the mission virtual computer using the second tier of communications can include communicating unmanned system control messages between the mission virtual computer and the remote control interface using the second tier of communications, such as discussed herein in the context at least of FIGS. 1 and 3. In some of these examples, communicating with the payload using the third tier of communications can include communicating payload control messages and payload data messages between the payload virtual computer and the payload using the third tier of communications, such as discussed herein in the context at least of FIGS. 1 and 3. In some of these examples, the third tier of communications can be associated with a third-tier network interface, and communicating payload control messages and payload data messages between the payload virtual computer and the payload using the third tier of communications can include: virtualizing the third-tier network interface into a first virtualized third-tier network interface and a second virtualized third-tier network interface, where the mission virtual computer is configured to communicate with the payload using the first virtualized third-tier network interface, and where the payload virtual computer is configured to communicate with the payload using the second virtualized third-tier network interface, such as discussed herein in the context at least of FIGS. 3 and 4.

In some examples, executing software on the physical computer additionally can be for: executing software for the mission virtual computer on a first core of the physical computer; and executing software for the payload virtual computer on a second core of the physical computer, such as discussed herein in the context at least of FIGS. 3 and 4.

In some examples, executing software on the physical computer additionally can be for: scheduling execution of the mission virtual computer during a first time slot using a scheduler; and scheduling execution of the payload virtual computer during a second time slot using the scheduler, where the first time slot is separate from the second time slot, such as discussed herein in the context at least of FIGS. 3 and 4.

In some examples, the software on the physical computer can include hypervisor software, determining whether a software fault has occurred on one virtual computer of the plurality of virtual computers can include determining whether a software fault has occurred on one virtual computer of the plurality of virtual computers using the hypervisor software, and preventing the software fault from causing a fault on a different virtual computer of the plurality of virtual computers can include preventing the software fault from causing a fault on a different virtual computer of the plurality of virtual computers using the hypervisor software, such as discussed herein in the context at least of FIGS. 3 and 4.

In some examples, the physical computer includes resource firewall hardware; then, method 700 can further include: preventing a task executing on the second core of the physical computer from accessing memory allocated to the first core of the physical computer using the resource firewall hardware, such as discussed herein in the context at least of FIG. 3.

FIG. 7 is a flowchart of method 700 for providing an unmanned system, according to an example embodiment. Method 700 is executable by an unmanned system, such as unmanned system 100 described herein.

FIG. 7 indicates that method 700 begins at block 710, where the unmanned system can be provided, where the unmanned system can include one or more core systems for the unmanned system, one or more auxiliary systems for the unmanned system, a payload, a physical computer, a network, and a power system, such as discussed herein in the context at least of FIGS. 1-4.

In some examples, the one or more core systems for the unmanned system can include an autopilot and one or more servos for controlling one or more flight control surfaces of the unmanned system, such as discussed herein in the context at least of FIG. 1.

In some examples, the network can include an input/output node configured to communicate with the physical computer using a packet-based interface and to receive inputs and provide outputs from a plurality of input/output devices via a plurality of communications protocols, such as discussed herein in the context at least of FIG. 5.

At block 720, the unmanned system can logically separate the network and the physical computer into at least a second tier of communications and a third tier of communications for at least: communicating between the physical computer and the one or more auxiliary systems for the unmanned system using the second tier of communications, and communicating between the physical computer and the payload using the third tier of communications, such as discussed herein in the context at least of FIGS. 1, 3, and 4.

In some examples, the physical computer can include software that, when executed by the physical computer, causes the physical computer at least to perform functionality of a plurality of virtual computers, such as discussed herein in the context at least of FIGS. 3 and 4. In some of these examples, the third tier of communications can be associated with a third-tier network interface, and the functionality of the plurality of virtual computers can include: virtualizing the third-tier network interface into a plurality of virtualized third-tier network interfaces, where the plurality of virtual computers are configured to utilize the plurality of virtualized third-tier network interfaces to communicate with the payload, such as discussed herein in the context at least of FIGS. 3 and 4.

In some examples, the network can further enables the physical computer to communicate with the core systems for the UMS using a first tier of communications that comprises position and stability control messages, such as discussed herein in the context at least of FIG. 1.

In some examples, the one or more auxiliary systems for the unmanned system can include a remote control interface, where the second tier of communications can include unmanned system control messages communicated between the physical computer and the remote control interface, such as discussed herein in the context at least of FIG. 1.

In some examples, the third tier of communications can include payload control messages and payload data messages communicated between the physical computer and the payload, such as discussed herein in the context at least of FIG. 1. In some of these examples, the payload can include one or more sensors and the payload data messages can include data collected by the one or more sensors, such as discussed herein in the context at least of FIG. 1. In some of these examples, the payload can include an imaging system and the payload data messages include one or more images and/or video imagery captured by the imaging system, such as discussed herein in the context at least of FIG. 1.

In some examples, message traffic for both the second tier of communications and the third tier of communications can be communicated using a single physical link of the network, such as discussed herein in the context at least of FIGS. 3 and 4.

In some examples, the network can include a switching device configured to logically separate the second tier of communications and the third tier of communications by at least: determining whether message traffic on the third tier of communications exceeds a third traffic threshold; and after determining that message traffic on the third tier of communications exceeds a third traffic threshold, limiting message traffic on the third tier of communications to be less than the third traffic threshold, such as discussed herein in the context at least of FIG. 1. In some of these examples, the switching device can be configured to logically separate the second tier of communications and the third tier of communications by at least: blocking all message traffic from the second tier of communications, from the third tier of communications, or from both the second tier of communications and the third tier of communications, such as discussed herein in the context at least of FIG. 1.

At block 730, the power system of the unmanned system can provide a first power domain for the one or more core systems for the unmanned system, a second power domain for the one or more auxiliary systems for the unmanned system, and a third power domain for the payload, such as discussed herein in the context at least of FIGS. 1 and 2.

At block 740, the unmanned system can utilize first circuitry of the power system to inhibit a single overcurrent fault in the third power domain from causing an electrical fault in either the first power domain or the second power domain, such as discussed herein in the context at least of FIGS. 1 and 2.

At block 750, the unmanned system can utilize second circuitry of the power system to inhibit a single overcurrent fault in the second power domain from causing an electrical fault in the first power domain, such as discussed herein in the context at least of FIGS. 1 and 2.

In some examples, the first power domain can include a first power module, the second power domain can include a second power module, and the third power domain can include a third power module, where the third power module can include the first circuitry, and where the second power module can include the second circuitry, such as discussed herein in the context at least of FIGS. 1 and 2. In some of these examples, the first power module can include circuitry to provide a first set of functions that include a function for providing power and a function for sensing provided power, such as discussed herein in the context at least of FIG. 2. In some of these examples, the second power module can include circuitry to provide a second set of functions that can include the first set of functions, a circuit breaking function, and a power on/off function, such as discussed herein in the context at least of FIG. 2. In some of these examples, the second power module can include a circuit breaker configured to performing the circuit breaking function, and where the second circuitry that inhibits a single overcurrent fault in the second power domain from causing an electrical fault in the first power domain can include the circuit breaker, such as discussed herein in the context at least of FIG. 2.

In some of these examples, the third power module can include circuitry to provide a third set of functions that include the second set of functions and a function for powering down the payload in response to a power fault, such as discussed herein in the context at least of FIG. 2. In some of these examples, each of the first power module, the second power module and the third power module can include a mode indicator to select between the first set of functions, the second set of functions, and the third set of functions, where the mode indicator for the first power module can be set to select the first set of functions, where the mode indicator for the second power module can be set to select the second set of functions, and where the mode indicator for the third power module can be set to select the third set of functions, such as discussed herein in the context at least of FIG. 2.

FIG. 8 is a flowchart of method 800 for operating an unmanned system, according to an example embodiment. Method 800 is executable by an unmanned system, such as unmanned system 100 described herein.

FIG. 8 indicates that method 800 begins at block 810, where the unmanned system can be provided, where the unmanned system can include one or more core systems for the unmanned system, one or more auxiliary systems for the unmanned system, a payload, and a power system, such as discussed herein in the context at least of FIGS. 1-4.

At block 820, the power system of the unmanned system can provide uninterruptible power for a first power domain that can include the one or more core systems for the unmanned system, such as discussed herein in the context at least of FIGS. 1 and 2.

At block 830, the power system of the unmanned system can provide interruptible power for each of a second power domain and a third power domain, where the second power domain can include the one or more auxiliary systems for the unmanned system and the third power domain can include the payload, such as discussed herein in the context at least of FIGS. 1 and 2.

At block 840, first circuitry of the power system of the unmanned system can prevent a single overcurrent fault in the third power domain from causing an electrical fault in either the first power domain or the second power domain, such as discussed herein in the context at least of FIG. 2.

At block 850, second circuitry of the power system of the unmanned system can prevent a single overcurrent fault in the second power domain from causing an electrical fault in the first power domain, such as discussed herein in the context at least of FIG. 2.

In some examples, the first power domain can include a first power module and method 800 can further include: providing a first set of functions using the first power module including: providing power to one or more loads and sensing the power provided to the one or more loads, such as discussed herein in the context at least of FIG. 2. In some of these examples, providing power to the one or more loads can include providing power of a predetermined voltage to the one or more loads, such as discussed herein in the context at least of FIG. 2. In some of these examples, sensing power provided to the one or more loads can include: sensing a voltage of the power provided to the one or more loads; sensing a current of the power provided to the one or more loads; or sensing both the voltage and the current of the power provided to the one or more loads, such as discussed herein in the context at least of FIG. 2.

In some of these examples, the second power domain can include a second power module and method 800 can further include: providing a second set of functions using the second power module, the second set of functions including: the first set of functions; providing a circuit breaking function for interrupting the interruptible power; and providing a power on/off function for stopping the interruptible power based on a power on/off signal, such as discussed herein in the context at least of FIG. 2. In some of these examples, providing the circuit breaking function for interrupting the interruptible power can include interrupting the interruptible power when a current of provided power exceeds a threshold current value that is selectable from among a plurality of threshold current values, such as discussed herein in the context at least of FIG. 2.

In some of these examples, the second power module can include circuitry to receive a reset signal, and providing the circuit breaking function for interrupting the interruptible power can include responding to the reset signal by changing the circuit breaking function from a state to disabling the interruptible power to a state for enabling the interruptible power, such as discussed herein in the context at least of FIG. 2. In some of these examples, the power on/off function can be configured to be either in a power-on state or a power-off state, and providing a power on/off function for stopping the interruptible power can include: disabling the interruptible power when the power on/off function is in the power-off state; and enabling the interruptible power when the power on/off function is in the power-on state, such as discussed herein in the context at least of FIG. 2. In some of these examples, the second power module can include a circuit breaker configured for performing the circuit breaking function, and preventing a single overcurrent fault in the second power domain from causing an electrical fault in the first power domain using second circuitry of the power system can include preventing a single overcurrent fault in the second power domain from causing an electrical fault in the first power domain using the circuit breaker, such as discussed herein in the context at least of FIG. 2

In some of these examples, the third power domain can include a third power module, and method 800 can further include: providing a third set of functions using the third power module, the third set of functions including: the second set of functions, disabling power to the payload after receiving an asserted payload-off signal; and enabling power to the payload after receiving a de-asserted payload-off signal, such as discussed herein in the context at least of FIG. 2. In some of these examples, disabling power to the payload can include: detecting the single overcurrent fault in the first power domain; after detecting the single overcurrent fault in the first power domain, asserting the asserted payload-off signal to the third power module; and after receiving the asserted payload-off signal, the third power module disabling power to the payload, such as discussed herein in the context at least of FIG. 2. In some of these examples, the unmanned system further can include an input/output node connected to the third power module, and disabling power to the payload can include: detecting the single overcurrent fault in the third power domain using the input/output node; after detecting the single overcurrent fault in the third power domain, the input/output node asserting the asserted payload-off signal; and after receiving the asserted payload-off signal, the third power module disabling power to the payload, such as discussed herein in the context at least of FIG. 2. In some of these examples, enabling power to the payload after a de-asserted payload-off signal received at the third power module can include: receiving an asserted payload-off signal at the third power module; after receiving the asserted payload-off signal, receiving a payload-off-override signal that de-asserts the payload-off signal at the third power module; and after receiving the payload-off-override signal, the third power module enabling power to the payload, such as discussed herein in the context at least of FIG. 2.

In some of these examples, each of the first power module, the second power module and the third power module can include a mode indicator to select between a first set of functions associated with the first power domain, a second set of functions associated with the second power domain, and a third set of functions associated with the third power domain, and where the method further can include: setting the mode indicator of the first power module to select the first set of functions; setting the mode indicator of the second power module to select the second set of functions; and setting the mode indicator of the third power module to select the third set of functions, such as discussed herein in the context at least of FIG. 2.

In some examples, the unmanned system can further include a battery and a propulsion module, and providing uninterruptible power for the first power domain can include receiving power from a plurality of power sources that include the battery and the propulsion module, such as discussed herein in the context at least of FIG. 2.

FIG. 9 is a flowchart of method 900 for controlling an unmanned system, according to an example embodiment. Method 900 is executable by an unmanned system, such as unmanned system 100 described herein.

FIG. 9 indicates that method 900 begins at block 910, where the unmanned system can be provided, where the unmanned system can include a network, one or more auxiliary systems for the unmanned system, and a payload, where the network connects the one or more auxiliary systems for the unmanned system and the payload, such as discussed herein in the context at least of FIGS. 1, 3, and 4.

At block 920, a network switch of the network of the unmanned system can logically separate the network into at least a second tier of communications and a third tier of communications, such as discussed herein in the context at least of FIGS. 1, 3, and 4.

At block 930, the network of the unmanned system can control the unmanned system using the network by at least: controlling the one or more auxiliary systems for the unmanned system using messages communicated by the second tier of communications, and communicating with the payload using messages communicated by the third tier of communications, such as discussed herein in the context at least of FIGS. 1, 3, and 4.

In some examples, where providing the unmanned system can include providing an autopilot and one or more servos for controlling one or more flight control surfaces of the unmanned system as part of one or more core systems for the unmanned system, such as discussed herein in the context at least of FIG. 1. In some of these examples, where controlling the unmanned system using the network further can include communicating messages for position and stability controls with at least the core systems for the unmanned system using the network, such as discussed herein in the context at least of FIG. 1. In some of these examples, the one or more auxiliary systems for the unmanned system can include a remote control interface, and controlling the unmanned system using the network can further include: determining whether the remote control interface is inactive; and after determining that the remote control interface is inactive, sending one or more messages for position and stability controls to at least the one or more core systems for the unmanned system, such as discussed herein in the context at least of FIG. 1. In some of these examples, where logically separating the network into at least the second tier of communications and the third tier of communications can include logically separating the network into at least a first tier of communications, the second tier of communications, and the third tier of communications, the first tier of communications used for controlling the one or more core systems for the unmanned system, such as discussed herein in the context at least of FIGS. 1 and 4.

In some examples, logically separating the network can include: determining whether message traffic on the third tier of communications exceeds a third traffic threshold; and after determining that message traffic on the third tier of communications exceeds a third traffic threshold, limiting message traffic on the third tier of communications to be no more than the third traffic threshold, such as discussed herein in the context at least of FIG. 1. In some of these examples, the third tier of communications can include a first type of messages and a second type of messages, and limiting message traffic on the third tier of communications to be no more than the third traffic threshold can include: determining whether first bandwidth used by message traffic of the first type of messages exceeds a first bandwidth threshold; after determining that the first bandwidth exceeds the first bandwidth threshold, limiting bandwidth used by message traffic of the first type of messages to no more than the first bandwidth threshold; determining whether second bandwidth used by message traffic of the second type of messages exceeds a second bandwidth threshold; and after determining that the second bandwidth exceeds the second bandwidth threshold, limiting bandwidth used by message traffic of the second type of messages to no more than the second bandwidth threshold, such as discussed herein in the context at least of FIG. 1.

In some examples, the network can include a first link and a second link that are physically separate, and controlling the unmanned system using the network can include: communicating messages for a first tier of communications using the first link; and communicating messages for both the second tier of communications and the third tier of communications using the second link, such as discussed herein in the context at least of FIG. 4.

In some examples, logically separating the network can include: using the network switch to block all message traffic from the second tier of communications, from the third tier of communications, or from both the second tier of communications and the third tier of communications, such as discussed herein in the context at least of FIG. 1.

In some examples, the network further can include one or more input/output nodes, and where controlling the one or more auxiliary systems for the unmanned system using messages communicated by the second tier of communications can include communicating the messages communicated by the second tier of communications using the one or more input/output nodes, such as discussed herein in the context at least of FIGS. 1 and 5. In some of these examples, the one or more input/output nodes support a plurality of communications protocols, and where communicating the messages communicated by the second tier of communications using the one or more input/output nodes can include communicating the messages communicated by the second tier of communications using the plurality of communications protocols of the one or more input/output nodes, such as discussed herein in the context at least of FIGS. 1 and 5.

In some examples, the unmanned system can include a physical computer having software that when executed, causes the physical computer to perform functionality of a mission virtual computer and a payload virtual computer; where controlling the one or more auxiliary systems for the unmanned system can include communicating messages on the second tier of communications between the mission virtual computer and the one or more auxiliary systems for the unmanned system; and where communicating with the payload using messages communicated by the third tier of communications can include communicating messages on the third tier of communications between the payload virtual computer and the payload, such as discussed herein in the context at least of FIGS. 1, 3, and 4.

The novel features believed characteristic of the illustrative embodiments are set forth in the appended claims. The illustrative embodiments, however, as well as a preferred mode of use, further objectives and descriptions thereof, will best be understood by reference to the present specification when read in conjunction with the accompanying drawings in which some, but not all of the disclosed embodiments may be shown.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
providing an unmanned system (UMS) that comprises one or more core systems for the UMS, one or more auxiliary systems for the UMS, a payload, and a power system;
providing uninterruptible power for a first power domain using the power system, the first power domain including the one or more core systems for the UMS;
providing interruptible power for each of a second power domain and a third power domain using the power system, the second power domain including the one or more auxiliary systems for the UMS, and the third power domain including the payload;
preventing a single overcurrent fault in the third power domain from causing an electrical fault in either the first power domain or the second power domain using first circuitry of the power system; and
preventing a single overcurrent fault in the second power domain from causing an electrical fault in the first power domain using second circuitry of the power system.

2. The method of claim 1, wherein the first power domain comprises a first power module, and wherein the method further comprises:
providing a first set of functions using the first power module comprising:
providing power to one or more loads and
sensing the power provided to the one or more loads.

3. The method of claim 2, wherein providing power to the one or more loads comprises providing power of a predetermined voltage to the one or more loads.

4. The method of claim 2, wherein sensing power provided to the one or more loads comprises:
sensing a voltage of the power provided to the one or more loads;
sensing a current of the power provided to the one or more loads; or
sensing both the voltage and the current of the power provided to the one or more loads.

5. The method of claim 2, wherein the second power domain comprises a second power module, and wherein the method further comprises:
providing a second set of functions using the second power module, the second set of functions comprising:
the first set of functions;
providing a circuit breaking function for interrupting the interruptible power; and
providing a power on/off function for stopping the interruptible power based on a power on/off signal.

6. The method of claim 5, wherein providing the circuit breaking function for interrupting the interruptible power comprises interrupting the interruptible power when a current of provided power exceeds a threshold current value that is selectable from among a plurality of threshold current values.

7. The method of claim 6, wherein the second power module comprises circuitry to receive a reset signal, and wherein providing the circuit breaking function for interrupting the interruptible power comprises responding to the reset signal by changing the circuit breaking function from a state to disabling the interruptible power to a state for enabling the interruptible power.

8. The method of claim 5, wherein the power on/off function is configured to be either in a power-on state or a power-off state, and wherein providing a power on/off function for stopping the interruptible power comprises:
disabling the interruptible power when the power on/off function is in the power-off state; and
enabling the interruptible power when the power on/off function is in the power-on state.

9. The method of claim 5, wherein the second power module comprises a circuit breaker configured for performing the circuit breaking function, and wherein preventing a single overcurrent fault in the second power domain from causing an electrical fault in the first power domain using second circuitry of the power system comprises preventing a single overcurrent fault in the second power domain from causing an electrical fault in the first power domain using the circuit breaker.

10. The method of claim 5, wherein the third power domain comprises a third power module, and wherein the method further comprises:
providing a third set of functions using the third power module, the third set of functions comprising:
the second set of functions;
disabling power to the payload after receiving an asserted payload-off signal; and
enabling power to the payload after receiving a de-asserted payload-off signal.

11. The method of claim 10, wherein disabling power to the payload comprises:
detecting the single overcurrent fault in the first power domain;
after detecting the single overcurrent fault in the first power domain, asserting the asserted payload-off signal to the third power module; and
after receiving the asserted payload-off signal, the third power module disabling power to the payload.

12. The method of claim 11, wherein the UMS further comprises an input/output node connected to the third power module, and wherein disabling power to the payload comprises:
detecting the single overcurrent fault in the third power domain using the input/output node;

after detecting the single overcurrent fault in the third power domain, the input/output node asserting the asserted payload-off signal; and after receiving the asserted payload-off signal, the third power module disabling power to the payload.

13. The method of claim 10, wherein enabling power to the payload after a de-asserted payload-off signal received at the third power module comprises:

receiving an asserted payload-off signal at the third power module;

after receiving the asserted payload-off signal, receiving a payload-off-override signal that de-asserts the payload-off signal at the third power module; and after receiving the payload-off-override signal, the third power module enabling power to the payload.

14. The method of claim 10, wherein each of the first power module, the second power module and the third power module comprises a mode indicator to select between a first set of functions associated with the first power domain, a second set of functions associated with the second power domain, and a third set of functions associated with the third power domain, and wherein the method further comprises:

setting the mode indicator of the first power module to select the first set of functions;

setting the mode indicator of the second power module to select the second set of functions; and setting the mode indicator of the third power module to select the third set of functions.

15. The method of claim 1, wherein the UMS further comprises a battery and a propulsion module, and wherein providing uninterruptible power for the first power domain comprises receiving power from a plurality of power sources that comprise the battery and the propulsion module.

16. An unmanned system (UMS), comprising:
one or more core systems for the UMS;
one or more auxiliary systems for the UMS;
a payload; and
a power system, configured for:
providing uninterruptible power for a first power domain using the power system, the first power domain including the one or more core systems for the UMS;
providing interruptible power for each of a second power domain and a third power domain using the power system, the second power domain including the one or more auxiliary systems for the UMS, and the third power domain including the payload;

preventing a single overcurrent fault in the third power domain from causing an electrical fault in either the first power domain or the second power domain using first circuitry of the power system; and preventing a single overcurrent fault in the second power domain from causing an electrical fault in the first power domain using second circuitry of the power system.

17. The UMS of claim 16, wherein the first power domain comprises a first power module having circuitry to provide at least a first set of functions, the first set of functions including a function for providing power to one or more loads and a function for sensing the power provided to the one or more loads.

18. The UMS of claim 17, wherein the second power domain comprises a second power module having circuitry to provide at least a second set of functions, the second set of functions including: the first set of functions, a circuit breaking function for interrupting the interruptible power, and a power on/off function for stopping the interruptible power based on a power on/off signal.

19. The UMS of claim 18, wherein the third power domain comprises a third power module having circuitry to provide at least a third set of functions, the third set of functions including: the second set of functions, a function for disabling power to the payload after receiving an asserted payload-off signal, and a function for enabling power to the payload after receiving a de-asserted payload-off signal.

20. The UMS of claim 19, wherein each of the first power module, the second power module and the third power module comprises a mode indicator to select between the first set of functions, the second set of functions, and the third set of functions, wherein the mode indicator for the first power module is set to select the first set of functions, wherein the mode indicator for the second power module is set to select the second set of functions, and wherein the mode indicator for the third power module is set to select the third set of functions.

* * * * *